US011915659B2

(12) United States Patent
Lee et al.

(10) Patent No.: US 11,915,659 B2
(45) Date of Patent: Feb. 27, 2024

(54) DISPLAY DEVICE

(71) Applicant: Samsung Display Co., Ltd., Yongin-si (KR)

(72) Inventors: Kanghee Lee, Yongin-si (KR); Joon-Chul Goh, Suwon-si (KR); Weonjun Choe, Hwaseong-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 17/871,379

(22) Filed: Jul. 22, 2022

(65) Prior Publication Data

US 2023/0055288 A1 Feb. 23, 2023

(30) Foreign Application Priority Data

Aug. 17, 2021 (KR) ........................ 10-2021-0108170

(51) Int. Cl.
*G09G 3/3275* (2016.01)
*G09G 3/3291* (2016.01)
*G09G 3/3233* (2016.01)
*G09G 3/3241* (2016.01)

(52) U.S. Cl.
CPC ......... *G09G 3/3275* (2013.01); *G09G 3/3291* (2013.01); *G09G 3/3233* (2013.01); *G09G 3/3241* (2013.01); *G09G 2300/0842* (2013.01); *G09G 2310/0297* (2013.01);
(Continued)

(58) Field of Classification Search
CPC ............... G09G 3/3275; G09G 3/3291; G09G 2300/0842; G09G 2310/0297; G09G 2320/0252; G09G 2320/0242; G09G 2330/021; G09G 3/3233; G09G 3/3241
See application file for complete search history.

(56) References Cited

U.S. PATENT DOCUMENTS 7,362,295 B2 4/2008 Park et al.
10,847,092 B2 11/2020 Bae et al.
11,158,248 B2 10/2021 Kang et al.
(Continued)

FOREIGN PATENT DOCUMENTS

KR 100945577 B1 3/2010
KR 101990111 B1 6/2019
(Continued)

*Primary Examiner* — Nitin Patel
*Assistant Examiner* — Saifeldin E Elnafia
(74) *Attorney, Agent, or Firm* — CANTOR COLBURN LLP

(57) ABSTRACT

A display device includes a display panel including a pixel, a driving controller that receives an image signal and outputs an image data signal in which the image signal is compensated, and a data driving circuit that provides the pixel with a data signal corresponding to the image data signal. The driving controller includes a memory, a hysteresis calculator that calculates a current hysteresis state value of a current frame based on the image signal and a previous hysteresis state value of a previous frame, which is stored in the memory, and stores the current hysteresis state value in the memory, and a compensator that calculates a compensation value based on the image signal and the previous hysteresis state value stored in the memory and compensates for the image signal depending on the compensation value to output the image data signal.

18 Claims, 18 Drawing Sheets

(52) U.S. Cl.
CPC ............... *G09G 2320/0242* (2013.01); *G09G 2320/0252* (2013.01); *G09G 2330/021* (2013.01)

(56) References Cited

U.S. PATENT DOCUMENTS

| | | | | |
|---|---|---|---|---|
| 2002/0015014 | A1* | 2/2002 | Sakashita | G09G 3/3611 345/87 |
| 2005/0225681 | A1* | 10/2005 | Sohn | G09G 3/2022 348/674 |
| 2014/0118410 | A1 | 5/2014 | Oh | |
| 2015/0097757 | A1* | 4/2015 | Bang | G06F 3/1454 345/2.2 |
| 2015/0339994 | A1* | 11/2015 | Verbeure | G09G 3/3614 345/214 |
| 2019/0096321 | A1* | 3/2019 | Yang | H01L 27/3211 |
| 2019/0147781 | A1* | 5/2019 | Park | G09G 3/006 345/691 |

FOREIGN PATENT DOCUMENTS

| | | | |
|---|---|---|---|
| KR | 20190062680 | A | 6/2019 |
| KR | 20200019307 | A | 2/2020 |

* cited by examiner

120

| Addr | S[k] |
|---|---|
| 0 | B11_R, B11_G, B11_B |
| 1 | B12_R, B12_G, B12_B |
| 2 | B13_R, B13_G, B13_B |
| ⋮ | ⋮ |
| (bxa)-1 | Bba_R, Bba_G, Bba_B |

FIG. 9

LUT1

| | | RGB | | | |
|---|---|---|---|---|---|
| | | 63 | 127 | 191 | 255 |
| S[k-1] | 0 | 4 | 10 | 15 | 21 |
| | 63 | 63 | 70 | 76 | 83 |
| | 127 | 124 | 127 | 130 | 133 |
| | 191 | 182 | 187 | 191 | 200 |
| | 255 | 240 | 245 | 250 | 255 |

FIG. 10

LUT2

| | | RGB | | | |
|---|---|---|---|---|---|
| | | 63 | 127 | 191 | 255 |
| S[k-1] | 0 | -3 | -3 | -3 | -2.5 |
| | 63 | 0 | -1 | -1.5 | -1.5 |
| | 127 | 1 | 0 | -0.8 | -1 |
| | 191 | 2 | 1 | 0 | -0.5 |
| | 255 | 3 | 2 | 0.5 | 0 |

LUT3

| | | RGB | | | |
|---|---|---|---|---|---|
| | | 63 | 127 | 191 | 255 |
| S[k-1] | 0 | 4.2 | 10.3 | 15.4 | 21.1 |
| | 63 | 63 | 70.3 | 76.6 | 83.2 |
| | 127 | 124.5 | 127 | 130.6 | 133.4 |
| | 191 | 182.6 | 187.5 | 191 | 200.9 |
| | 255 | 240.7 | 245.7 | 250.9 | 255 |

FIG. 15A

| | | | | | | | | |
|---|---|---|---|---|---|---|---|---|
| RGB | 16 | 0 | | | | | 16 | |
| FRAME # | f | f+60 | f+120 | f+180 | • • • | f+600 | f+660 | f+720 |
| S[k-1] | 16 | 16 | 15 | 14 | • • • | 9 | 8 | 9 |
| S[k] | 16 | 15 | 14 | 13 | • • • | 8 | 9 | 10 |
| DATA | 16 | 0 | 0 | 0 | • • • | 0 | 14 | 15 |

FIG. 15B

| RGB | 16 | 128 | | | | | 16 | |
|---|---|---|---|---|---|---|---|---|
| FRAME # | f | f+60 | f+120 | f+180 | ••• | f+600 | f+660 | f+720 |
| S[k-1] | 16 | 16 | 23 | 30 | ••• | 66 | 70 | 66 |
| S[k] | 16 | 23 | 30 | 36 | ••• | 70 | 66 | 62 |
| DATA | 16 | 124 | 125 | 126 | ••• | 127 | 18 | 17 |

DISPLAY DEVICE

This application claims priority to Korean Patent Application No. 10-2021-0108170, filed on Aug. 17, 2021, and all the benefits accruing therefrom under 35 U.S.C. § 119, the content of which in its entirety is herein incorporated by reference.

BACKGROUND

1. Field

Embodiments of the invention described herein relate to a display device.

2. Description of the Related Art

Each of multimedia electronic devices such as a television, a mobile phone, a tablet computer, a navigation, a game console, and the like includes a display module for displaying an image.

An organic light-emitting display device among display devices displays an image using an organic light-emitting diode which generates light through recombination of electrons and holes. Such an organic light-emitting display device is driven by low power consumption and also has a fast response speed.

The organic light-emitting display device includes pixels connected to data lines and a scan line. Each of the pixels generally includes an organic light-emitting diode, and a circuit for controlling an amount of current flowing to the organic light-emitting diode. The organic light-emitting diode generates a light of predetermined luminance in response to the amount of current supplied from the circuit.

SUMMARY

Embodiments of the invention provide a display device for compensating for degradation of a pixel.

In an embodiment, a display device includes a display panel including a pixel, a driving controller that receives an image signal and outputs an image data signal in which the image signal is compensated, and a data driving circuit that provides the pixel with a data signal corresponding to the image data signal. The driving controller includes a memory, a hysteresis calculator that calculates a current hysteresis state value of a current frame based on the image signal and a previous hysteresis state value of a previous frame, the previous hysteresis state value being stored in the memory, and stores the current hysteresis state value in the memory, and a compensator that calculates a compensation value based on the image signal and the previous hysteresis state value stored in the memory and compensates for the image signal depending on the compensation value to output the image data signal.

In an embodiment, the hysteresis calculator may include a first lookup table. The hysteresis calculator may output the current hysteresis state value corresponding to the image signal and the previous hysteresis state value with reference to the first lookup table.

In an embodiment, the hysteresis calculator may output a sum of multiplication of the image signal and a first weight and multiplication of the previous hysteresis state value and a second weight as the current hysteresis state value.

In an embodiment, the compensator may include a second lookup table. The hysteresis calculator may obtain the compensation value corresponding to the image signal and the previous hysteresis state value with reference to the second lookup table and may compensate for the image signal depending on the compensation value to output the image data signal.

In an embodiment, the pixel may include first to third color pixels. The current hysteresis state value may include first to third state values respectively corresponding to the first to third color pixels.

In an embodiment, the hysteresis calculator may divide the display panel into a plurality of blocks, may calculate a representative value corresponding to each of the plurality of blocks in the image signal, and may calculate the current hysteresis state value corresponding to each of the plurality of blocks based on the representative value corresponding to each of the plurality of blocks and the previous hysteresis state value corresponding to each of the plurality of blocks.

In an embodiment, the hysteresis calculator may include a calculator that calculates a state value based on the image signal and the previous hysteresis state value of the previous frame, the previous hysteresis state value being stored in the memory, and a dithering unit that dithers the state value using a plurality of dither patterns and outputs the current hysteresis state value corresponding to a result of dithering the state value.

In an embodiment, the hysteresis calculator may calculate the current hysteresis state value based on the image signal and the previous hysteresis state value every predetermined time and may store the current hysteresis state value in the memory.

In an embodiment, the compensator may include a difference value calculator that calculates a difference value between the image signal and the previous hysteresis state value and outputs an update signal at an active level when the difference value is greater than a reference value. The hysteresis calculator may calculate the current hysteresis state value based on the image signal and the previous hysteresis state value, when the update signal is at the active level.

In an embodiment, the hysteresis calculator may include a counter that is synchronized with the update signal to operate. The hysteresis calculator may calculate the current hysteresis state value of the current frame based on the image signal, the previous hysteresis state value, and a count value of the counter.

In an embodiment, the display device may further include a still image discriminator that compares an image signal of the current frame with an image signal of the previous frame to determine whether the image signal of the current frame is a still image signal.

In an embodiment, the hysteresis calculator and the compensator may do not operate, when the image signal of the current frame is the still image signal.

In an embodiment, a display device includes a display panel including a pixel, a driving controller that receives an image signal and outputs an image data signal in which the image signal is compensated, and a data driving circuit that provides the pixel with a data signal corresponding to the image data signal. The driving controller includes a memory, a multiplexer that outputs any one of the image signal and the image data signal as an output signal, a hysteresis calculator that calculates a current hysteresis state value of a current frame based on the output signal from the multiplexer and a previous hysteresis state value of a previous frame, the previous hysteresis state value being stored in the memory, and stores the current hysteresis state value in the memory, and a compensator that calculates a compensation value based on the image signal and the previous hysteresis state value stored in the memory and compensates for the image signal depending on the compensation value to output the image data signal.

In an embodiment, the hysteresis calculator may include a first lookup table. The hysteresis calculator may output the current hysteresis state value corresponding to the output signal from the multiplexer and the previous hysteresis state value with reference to the first lookup table.

In an embodiment, the hysteresis calculator may output a sum of multiplication of the output signal from the multiplexer and a first weight and multiplication of the previous hysteresis state value and a second weight as the current hysteresis state value.

In an embodiment, the compensator may include a second lookup table. The hysteresis calculator may obtain the compensation value corresponding to the output signal from the multiplexer and the previous hysteresis state value with reference to the second lookup table and may compensate for the image signal depending on the compensation value to output the image data signal.

In an embodiment, the hysteresis calculator may divide the display panel into a plurality of blocks, may calculate a representative value corresponding to each of the plurality of blocks in the output signal from the multiplexer, and may calculate the current hysteresis state value corresponding to each of the plurality of blocks based on the representative value corresponding to each of the plurality of blocks and the previous hysteresis state value corresponding to each of the plurality of blocks.

In an embodiment, the hysteresis calculator may include a calculator that calculates a state value based on the output signal from the multiplexer and the previous hysteresis state value of the previous frame, the previous hysteresis state value being stored in the memory and a dithering unit that dithers the state value using a plurality of dither patterns and outputs the current hysteresis state value corresponding to a result of dithering the state value.

In an embodiment, the hysteresis calculator may calculate the current hysteresis state value based on the image signal and the previous hysteresis calculator every predetermined time and may store the current hysteresis state value in the memory.

In an embodiment, the compensator may include a difference value calculator that calculates a difference value between the image signal and the previous hysteresis state value and outputs an update signal at an active level when the difference value is greater than a reference value. The hysteresis calculator may calculate the current hysteresis state value based on the output signal from the multiplexer and the previous hysteresis state value, when the update signal is at the active level.

BRIEF DESCRIPTION OF THE DRAWINGS

The above and other embodiments, advantages and features of the invention will become apparent by describing in detailed embodiments thereof with reference to the accompanying drawings, in which:

FIG. 9 illustrates a first lookup table used by a hysteresis calculator;

FIG. 10 illustrates a second lookup table used by a compensator;

FIGS. 15A and 15B are drawings illustrating a previous hysteresis state value, a current hysteresis state value, and an image data signal according to an image signal input to a display device;

DETAILED DESCRIPTION

Figure 1:
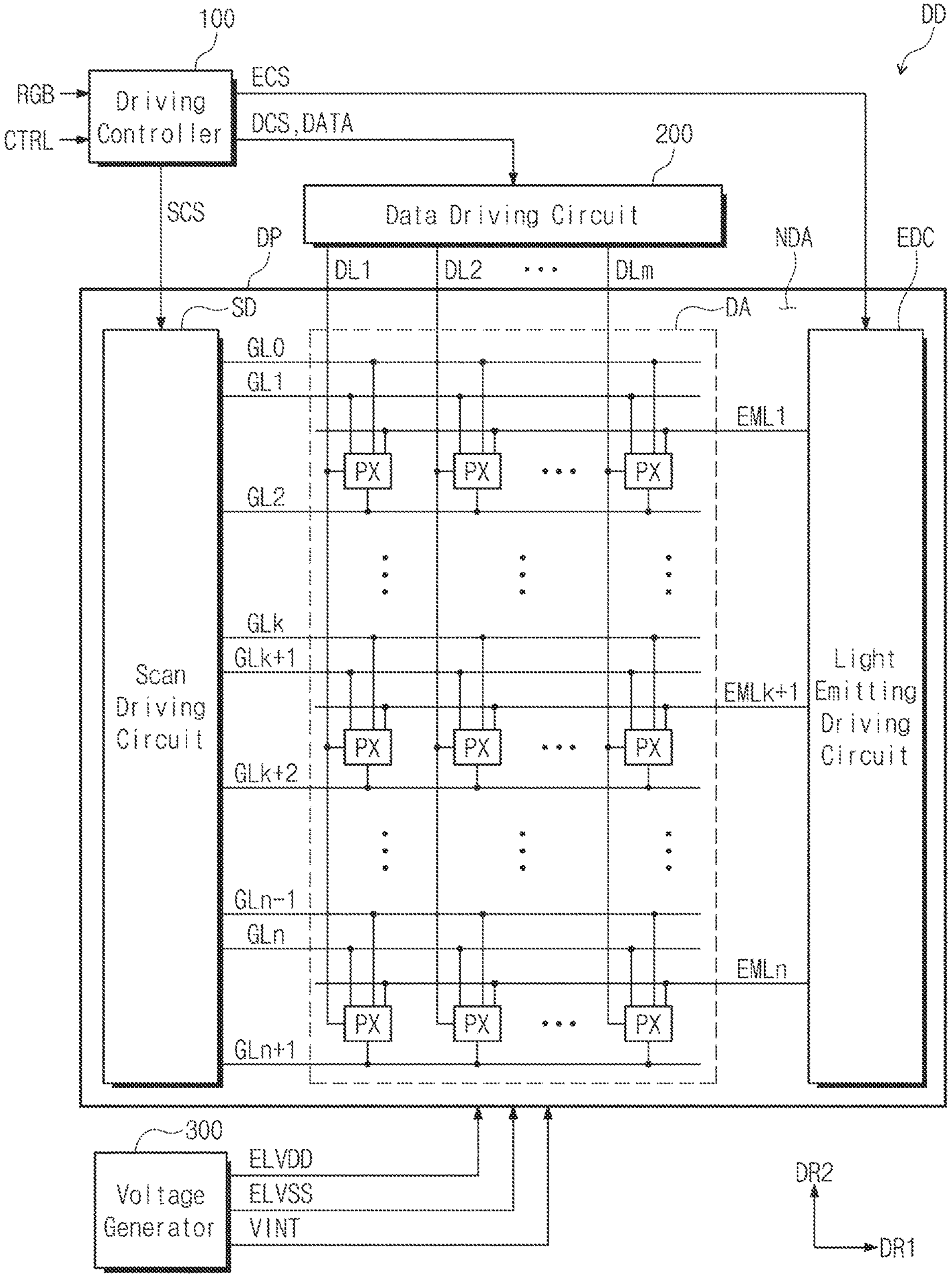
FIG. 1 is a block diagram of an embodiment of a display device according to the invention.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like elements. Also, in the drawings, the thicknesses, the ratios, and the dimensions of the elements may be exaggerated for effective description of technical contents. The expression "and/or" includes all combinations of one or more of the associated listed items.

Although the terms such as "first", "second", or the like may be used herein to describe various elements, these elements should not be limited by these terms. These terms are only used to distinguish one element from another element. A first element could be termed a second element without departing from the scope of the claims of the invention, and similarly a second element could be termed a first element, for example. The singular forms are intended to include the plural forms unless the context clearly indicates otherwise.

In addition, the terms “under”, “lower”, “above”, “upper”, etc. are used to describe the correlation between the elements illustrated in the drawings. These terms are relative concepts and are described on the basis of the directions shown in the drawings.

It should be further understood that the terms “includes/comprises” or “have” etc. specify the presence of stated features, integers, steps, operations, elements, parts, or combinations thereof, but do not preclude the possibility of the presence or addition of one or more other features, integers, steps, operations, elements, parts or combinations thereof.

“About” or “approximately” as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term “about” can mean within one or more standard deviations, or within ±30%, 20%, 10%, 5% of the stated value, for example.

Unless otherwise defined, all terms (including technical terms and scientific terms) used in this specification have the same meaning as commonly understood by those skilled in the art to which the invention belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the invention will be described with reference to accompanying drawings.

FIG. 1 is a block diagram of an embodiment of a display device according to the invention.

Referring to FIG. 1, a display device DD may include a driving controller 100, a data driving circuit 200, a voltage generator 300, and a display panel DP.

The driving controller 100 may receive an image signal RGB and a control signal CTRL. The driving controller 100 may generate an image data signal DATA into which a data format of the image signal RGB is converted to suit interface specifications with the data driving circuit 200. The driving controller 100 may output a scan control signal SCS, a data control signal DCS, and a light-emitting control signal ECS.

The data driving circuit 200 may receive the data control signal DCS and the image data signal DATA from the driving controller 100. The data driving circuit 200 may convert the image data signal DATA into data signals and may output the data signals to a plurality of data lines DL1-DLm (m is a natural number) which will be described below. The data signals may be analog voltages corresponding to a gray scale value of the image data signal DATA.

The display panel DP may include scan lines GL0-GLn+1 (n is a natural number), light-emitting control lines EML1-EMLn, data lines DL1-DLm, and pixels PX. The display panel DP may further include a scan driving circuit SD and a light-emitting driving circuit EDC. In an embodiment, the scan driving circuit SD may be arranged at a first side (e.g., left side in FIG. 1) of the display panel DP. The scan lines GL0-GLn+1 may be extended in a first direction DR1 from the scan driving circuit SD. In an embodiment, the display panel DP may include a display area DA displaying an image and a non-display area NDA non-displaying an image. The pixels PX may be disposed in the display area DA, and the scan driving circuit SD and light-emitting driving circuit EDC may be disposed in the non-display area NDA, but the invention is not limited thereto.

The light-emitting driving circuit EDC may be arranged at a second side (e.g., right side in FIG. 1) of the display panel DP. The light-emitting control lines EML1-EMLn may be extended in a direction opposite to the first direction DR1 from the light-emitting driving circuit EDC.

The scan lines GL0-GLn+1 and the light-emitting control lines EML1-EMLn may be arranged spaced apart from each other in a second direction DR2. The data lines DL1-DLm may be extended in a direction opposite to the second direction DR2 from the data driving circuit 200 and may be arranged spaced apart from each other in the first direction DR1.

In the embodiment shown in FIG. 1, the scan driving circuit SD and the light-emitting driving circuit EDC may be arranged to face with each other across the pixels PX, but the invention is not limited thereto. In an embodiment, the scan driving circuit SD and the light-emitting driving circuit EDC may be disposed adjacent to each other at any one of the first side and the second side of the display panel DP, for example. In an embodiment, the scan driving circuit SD and the light-emitting driving circuit EDC may be configured as one circuit.

The plurality of pixels PX may be respectively and electrically connected to the scan lines GL0-GLn+1, the light-emitting control lines EML1-EMLn, and the data lines DL1-DLm. Each of the plurality of pixels PX may be electrically connected to three scan lines and one light-emitting control line. In an embodiment, as shown in FIG. 1, pixels PX in a first row may be connected to the scan lines GL0, GL1, and GL2 and the light-emitting control line EML1. Furthermore, pixels PX in a (k+1)-th row (k is a natural number equal to or less than n−1) may be connected to scan lines GLk, GLk+1, and GLk+2 and a light-emitting control line EMLk+1, for example.

Each of the plurality of pixels PX may include a light-emitting diode ED (refer to FIG. 2) and a pixel circuit PXC (refer to FIG. 2) for controlling light emission of the light-emitting diode ED. The pixel circuit PXC may include one or more transistors and one or more capacitors. The scan driving circuit SD and the light-emitting driving circuit EDC may include transistors formed or provided through the same process as that of the pixel circuit PXC.

Each of the plurality of pixels PX may receive a first driving voltage ELVDD, a second driving voltage ELVSS, and an initialization voltage VINT.

The scan driving circuit SD may receive the scan control signal SCS from the driving controller 100. The scan driving circuit SD may output scan signals to the scan lines GL0-GLn+1 in response to the scan control signal SCS. A circuit configuration and an operation of the scan driving circuit SD will be described in detail below.

The driving controller 100 in an embodiment may calculate degradation characteristics of the pixels PX, may compensate for an image signal RGB based on the calculated degradation characteristics (e.g., a hysteresis characteristic of the transistor), and may output an image data signal DATA.

Figure 2:
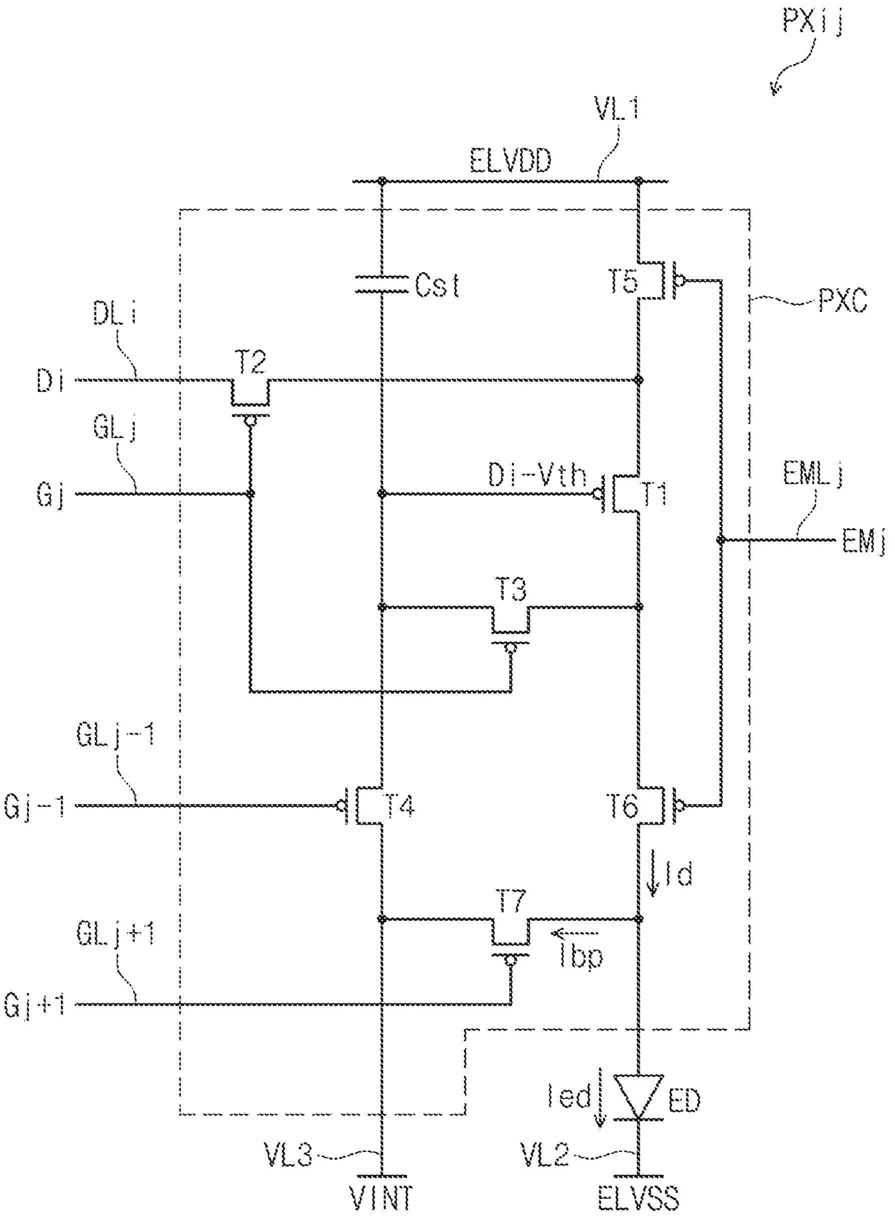
FIG. 2 is an equivalent circuit diagram of an embodiment of a pixel according to the invention.

FIG. 2 is an equivalent circuit diagram of an embodiment of a pixel according to the invention.

FIG. 2 illustrates an equivalent circuit diagram of a pixel PXij connected to an i-th data line DLi among data lines DL1-DLm shown in FIG. 1, a (j−1)-th scan line GLj-1, a j-th scan line GLj, and a (j+1)-th scan line GLj+1 among scan lines GL0-GLn+1, and a j-th light-emitting control line EMLj among light-emitting control lines EML1-EMLn. Herein, the i-th data line DLi may be briefly referred to as data line DLi, the j-th light-emitting control line EMLj may be briefly referred to as light-emitting control line EMLj.

Each of a plurality of pixels PX shown in FIG. 1 may have the same circuit configuration as the equivalent circuit diagram of a pixel PXij shown in FIG. 2. The pixel PXij may include a pixel circuit PXC and at least one light-emitting diode ED. In an embodiment, a description will be given of an example in which the one pixel PXij includes one light-emitting diode ED.

In an embodiment, the pixel circuit PXC of the pixel PXij may include first to seventh transistors T1-T7 and one capacitor Cst. Furthermore, each of the first to seventh transistors T1-T7 may be a P-type transistor having a low-temperature polycrystalline silicon ("LTPS") semiconductor layer. However, the invention is not limited thereto, and each of the first to seventh transistors T1-T7 may be an N-type transistor in which an oxide semiconductor is used as a semiconductor layer. In an embodiment, at least one of the first to seventh transistors T1-T7 may be the N-type transistor, and the rest of them may be the P-type transistor. Moreover, the circuit configuration of a pixel according to the invention is not limited to FIG. 2. The pixel circuit PXC illustrated in FIG. 2 is only an example, and the configuration of the pixel circuit PXC may be modified and implemented.

The (j−1)-th scan line GLj−1, the j-th scan line GLj, the (j+1)-th scan line GLj+1, and the j-th light-emitting control line EMLj may deliver a (j−1)-th scan signal Gj−1, a j-th scan signal Gj, a (j+1)-th scan signal Gj+1, and a light-emitting signal EMj, respectively. The data line DLi may deliver a data signal Di. The data signal Di may have a voltage level corresponding to an image signal RGB input to a display device DD (refer to FIG. 1). First to third driving voltage lines VL1, VL2, and VL3 may respectively deliver a first driving voltage ELVDD, a second driving voltage ELVSS, and the initialization voltage VINT.

The first transistor T1 may include a first electrode connected with the first driving voltage line VL1 via the fifth transistor T5, a second electrode electrically connected with an anode of the light-emitting diode ED via the sixth transistor T6, and a gate electrode connected with one end of the capacitor Cst. The first transistor T1 may receive the data signal Di delivered by the data line DLi depending on the switching operation of the second transistor T2 and may supply a driving current Id to the light-emitting diode ED.

The second transistor T2 may include a first electrode connected with the data line DLi, a second electrode connected with the first electrode of the first transistor T1, and a gate electrode connected with the j-th scan line GLj. The second transistor T2 may be turned on according to the scan signal Gj delivered through the j-th scan line GLj to deliver the data signal Di, delivered from the data line DLi, to the first electrode of the first transistor T1.

The third transistor T3 may include a first electrode connected with the gate electrode of the first transistor T1, a second electrode connected with the second electrode of the first transistor T1, and a gate electrode connected with the j-th scan line GLj. The third transistor T3 may be turned on according to the scan signal Gj delivered through the j-th scan line GLj to connect the gate electrode of the first transistor T1 and the second electrode of the first transistor T1, thus diode-connecting the first transistor T1.

The fourth transistor T4 may include a first electrode connected with the gate electrode of the first transistor T1, a second electrode connected with the third driving voltage line VL3 through which the initialization voltage VINT is supplied, and a gate electrode connected with the (j−1)-th scan line GLj−1. The fourth transistor T4 may be turned on according to the (j−1)-th scan signal Gj−1 delivered through the (j−1)-th scan line GLj−1 to supply the initialization voltage VINT to the gate electrode of the first transistor T1, thus performing an initialization operation of initializing a voltage of the gate electrode of the first transistor T1.

The fifth transistor T5 may include a first electrode connected with the first driving voltage line VL1, a second electrode connected with the first electrode of the first transistor T1, and a gate electrode connected with the light-emitting control line EMLj.

The sixth transistor T6 may include a first electrode connected with the second electrode of the first transistor T1, a second electrode connected with the anode of the light-emitting diode ED, and a gate electrode connected with the light-emitting control line EMLj.

The fifth transistor T5 and the sixth transistor T6 may be simultaneously turned on according to the light-emitting signal EMj delivered through the light-emitting control line EMLj. As a result, the first driving voltage ELVDD may be compensated through the first transistor T1 diode-connected and may be supplied to the light-emitting diode ED.

The seventh transistor T7 may include a first electrode connected with the second electrode of the fourth transistor T4, a second electrode connected with the second electrode of the sixth transistor T6, and a gate electrode connected with the (j+1)-th scan line GLj+1.

As described above, one end of the capacitor Cst may be connected with the gate electrode of the first transistor T1, and the other end of the capacitor Cst may be connected with the first driving voltage line VL1. The cathode of the light-emitting diode ED may be connected with the second driving voltage line VL2 which supplies the second driving voltage ELVSS.

Figure 3:
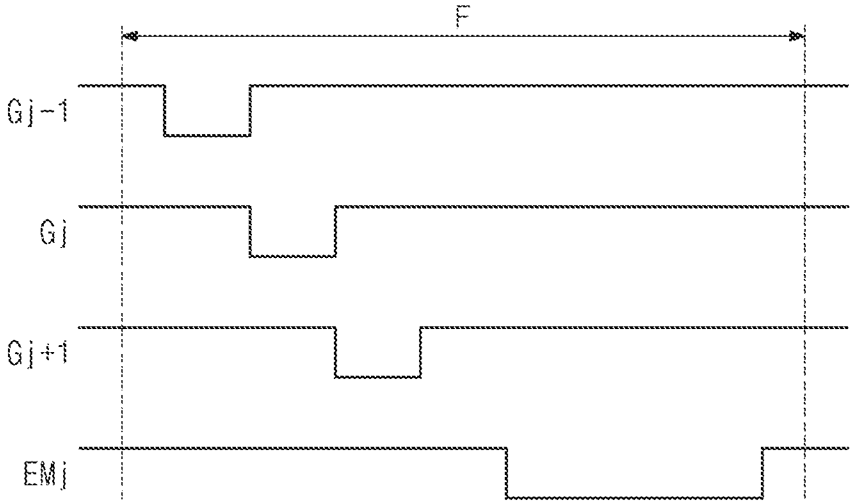
FIG. 3 is a timing diagram for describing an operation of a pixel illustrated in FIG. 2.

FIG. 3 is a timing diagram for describing an operation of a pixel illustrated in FIG. 2. An operation of a display device in an embodiment will be described with reference to FIGS. 2 and 3.

Referring to FIGS. 2 and 3, a (j−1)-th scan signal Gj−1 having a low level may be provided through a (j−1)-th scan line GLj−1 during an initialization period within one frame F. As a fourth transistor T4 is turned on in response to the (j−1)-th scan signal Gj−1 having the low level and as an initialization voltage VINT is supplied to a gate electrode of a first transistor T1 through the fourth transistor T4, the first transistor T1 may be initialized.

Next, when a j-th scan signal Gj having the low level is provided through the j-th scan line GLj during a data programming and compensation period, the third transistor T3 may be turned on. The first transistor T1 may be diode-connected by the third transistor T3 turned on and may be forward biased. Furthermore, a second transistor T2 may be turned on by the j-th scan signal Gj having the low level. Then, a compensation voltage (Di-Vth), in which the data signal Di provided from the data line DLi decreases by a threshold voltage Vth of the first transistor T1, may be applied to the gate electrode of the first transistor T1. In other words, a gate voltage applied to the gate electrode of the first transistor T1 may be the compensation voltage (Di-Vth).

As the first driving voltage ELVDD and the compensation voltage (Di-Vth) are applied to opposite ends of a capacitor Cst, charges corresponding to a voltage difference of the opposite ends may be stored in the capacitor Cst. A seventh transistor T7 may be turned on by receiving a (j+1)-th scan signal Gj+1 having a low level through the (j+1)-th scan line GLj+1. A portion of a driving current Id may be drained through the seventh transistor T7 as a bypass current Ibp by the seventh transistor T7.

When a light-emitting diode ED emits light although a minimum current of the first transistor T1, which displays a black image, flows as a driving current, the black image may fail to be properly displayed. Thus, the seventh transistor T7 in the pixel PXij (i is a natural number equal to or less than m and j is natural numbers equal to or less than n) in an embodiment of the invention may disperse a portion of the minimum current of the first transistor T1 to a current path, which is different from a current path to the light-emitting diode ED, as the bypass current Ibp. Herein, the minimum current of the first transistor T1 refers to a current flowing under the condition that, as a gate-source voltage Vgs (refer to FIG. 4) of the first transistor T1 is smaller than the threshold voltage Vth, the first transistor T1 is turned off. As a minimum driving current (e.g., a current of about 10 picoamperes (pA) or less) under the condition that the first transistor T1 is turned off is delivered to the light-emitting diode ED, it may be represented as an image of black luminance. The influence of a bypass transfer of the bypass current Ibp may be great when the minimum driving current displaying a black image flows, whereas there may be substantially no influence of the bypass current Ibp when a large driving current displaying an image such as a normal image or a white image flows. Thus, when a driving current Id for displaying a black image flows, a light-emitting current led of the light-emitting diode ED, in which the driving current Id decreases by the amount of the bypass current Ibp drained through the seventh transistor T7, may have a minimum current amount to such an extent as to accurately express the black image. Thus, a contrast ratio may be improved by implementing an accurate black luminance image using the seventh transistor T7. In an embodiment, the bypass signal may be the (j+1)-th scan signal Gj+1 having a low level, but not necessarily limited thereto.

Next, during a light-emitting period, a light-emitting signal EMj provided from a light-emitting control line EMLj may change from a high level to a low level. During a light-emitting period, a fifth transistor T5 and a sixth transistor T6 may be turned on by the light-emitting signal EMj having the low level. Then, the driving current Id may be generated according to a voltage difference between the gate voltage of the gate electrode of the first transistor T1 and the first driving voltage ELVDD and may be supplied to the light-emitting diode ED through the sixth transistor T6, and the light-emitting current led may flow in the light-emitting diode ED.

As such, the light-emitting current led supplied to the light-emitting diode ED may be determined according to a voltage difference between a voltage of the gate electrode of the first transistor T1 and the first driving voltage ELVDD, that is, a gate-source voltage (hereinafter, represented as "Vgs") of the first transistor T1. The threshold voltage Vth of the first transistor T1 may vary with the gate-source voltage Vgs of the first transistor T1.

Figure 4:
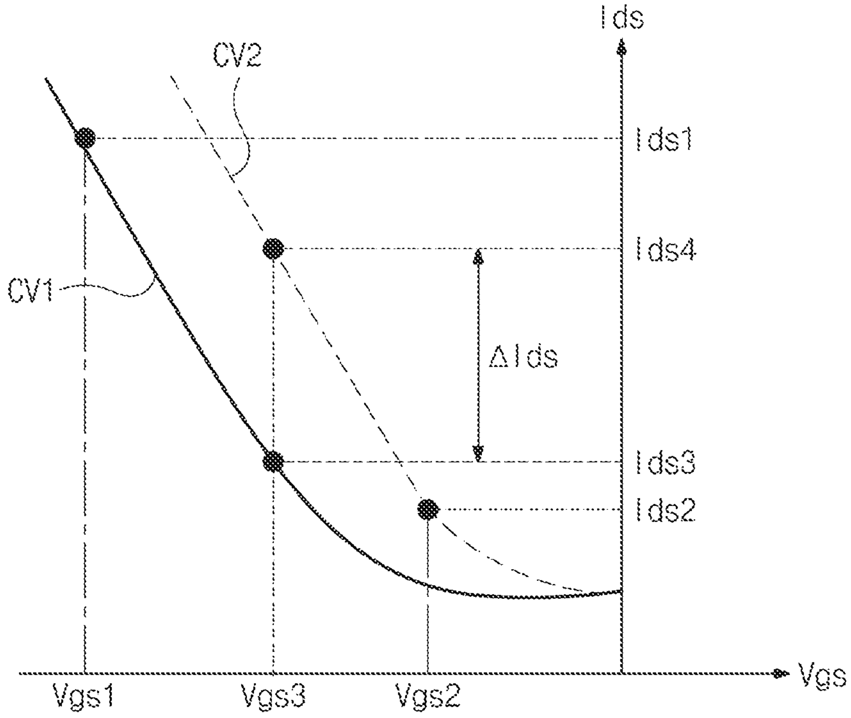
FIG. 4 is a drawing illustrating a voltage-current characteristic of a first transistor shown in FIG. 2.

FIG. 4 is a drawing illustrating a voltage-current characteristic of a first transistor shown in FIG. 2.

In FIG. 4, a first curve CV1 is a voltage-current characteristic of the first transistor T1 when a data signal Di of a (k−1)-th frame has a first gray scale level, and a second curve CV2 is a voltage-current characteristic of the first transistor T1 when the data signal Di of the (k−1)-th frame has a second gray scale level.

It is assumed that a gate-source voltage Vgs of the first transistor T1 is a first voltage Vgs1 when the data signal Di of the (k−1)-th frame has the first gray scale level and that the gate-source voltage Vgs of the first transistor T1 is a second voltage Vgs2 when the data signal Di of the (k−1)-th frame has the second gray scale level.

A current flowing through the first transistor T1 may be a first current Ids' when the data signal Di of the (k−1)-th frame has the first gray scale level, and a current flowing through the first transistor T1 may be a second current Ids2 when the data signal Di of the (k−1)-th frame has the second gray scale level.

When the data signal Di in a k-th frame has a third gray scale level, the gate-source voltage Vgs of the first transistor T1 may be a third voltage Vgs3.

When the voltage-current characteristic of the first transistor T1 in the (k−1)-th frame is the first curve CV1 and when the gate-source voltage Vgs of the first transistor T1 in the k-th frame changes to the third voltage Vgs3, a current flowing through the first transistor T1 may be a third current Ids3.

When the voltage-current characteristic of the first transistor T1 in the (k−1)-th frame is the second curve CV2 and when the gate-source voltage Vgs of the first transistor T1 in the k-th frame changes to the third voltage Vgs3, a current flowing through the first transistor T1 may be a fourth current Ids4.

When a voltage corresponding to the data signal Di in the k-th frame is supplied to the gate electrode of the first transistor T1, a current flowing through the first transistor T1 may have a difference by Aids depending on a voltage level of the data signal Di in the (k−1)-th frame. Such a current difference may be caused by a threshold voltage Vth of the first transistor T1. As such, dependency of the threshold voltage Vth for the gate-source voltage Vgs of the first transistor T1 may be also referred to as hysteresis.

Figure 5:
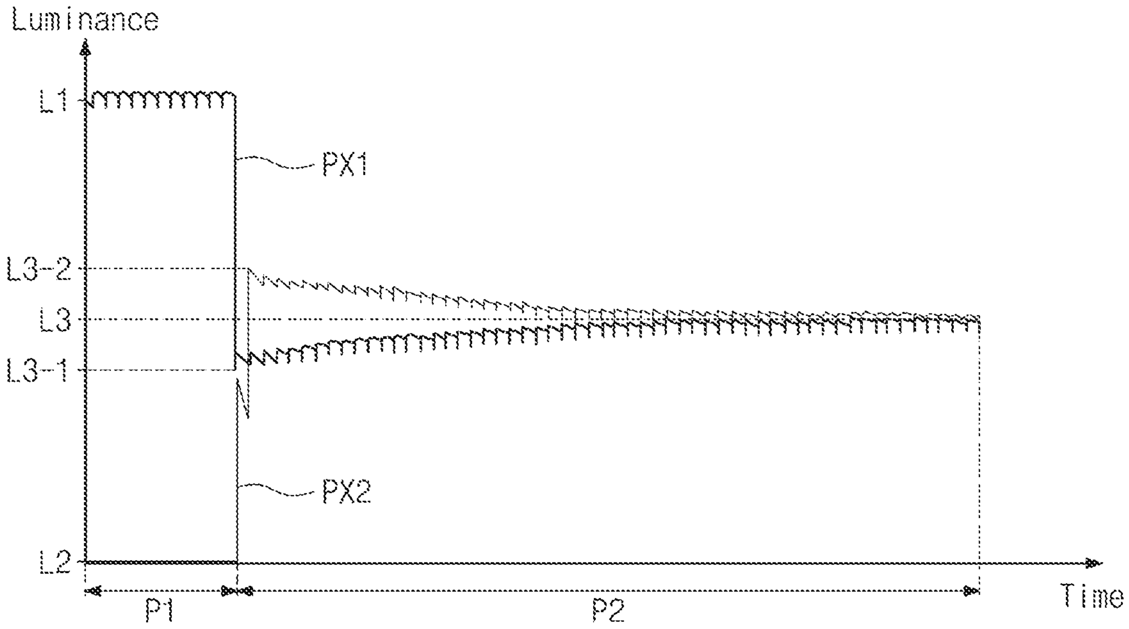
FIG. 5 is a drawing illustrating a change in luminance according to a data signal provided to pixels.

FIG. 5 is a drawing illustrating a change in luminance according to a data signal provided to pixels.

Referring to FIG. 5, it is assumed that a data signal Di (refer to FIG. 2) of a first gray scale level is provided to a first pixel PX1 among pixels PX (refer to FIG. 1) in a first interval P1 and that a data signal Di of a second gray scale level is provided to a second pixel PX2 among the pixels PX. In the first interval P1, a luminance of the first pixel PX1 may have a first luminance level L1 and a luminance of the second pixel PX2 may have a second luminance level L2. In an embodiment, the first luminance level L1 may be higher than the second luminance level L2.

A data signal Di (refer to FIG. 2) having a third gray scale level between a first gray scale level and a second gray scale level at a start time of a second interval P2 may be provided to the first pixel PX1 and the second pixel PX2 in the same manner.

A luminance of the first pixel PX1 may decrease to luminance L3−1 lower than third luminance L3 corresponding to the third gray scale level by a hysteresis characteristic of the first pixel PX1 and may then change to the third luminance L3 over time.

A luminance of the second pixel PX2 may increase to luminance L3−2 higher than the third luminance L3 corresponding to the third gray scale level by a hysteresis characteristic of the second pixel PX2 and may then change to the third luminance L3 over time.

In other words, although the same data signal Di (refer to FIG. 2) is provided to the first pixel PX1 and the second pixel PX2, luminance of the first pixel PX1 and luminance of the second pixel PX2 may be different from each other during a predetermined time from the start time of the second interval P2. Such a luminance difference is visible to a user.

Figure 6:
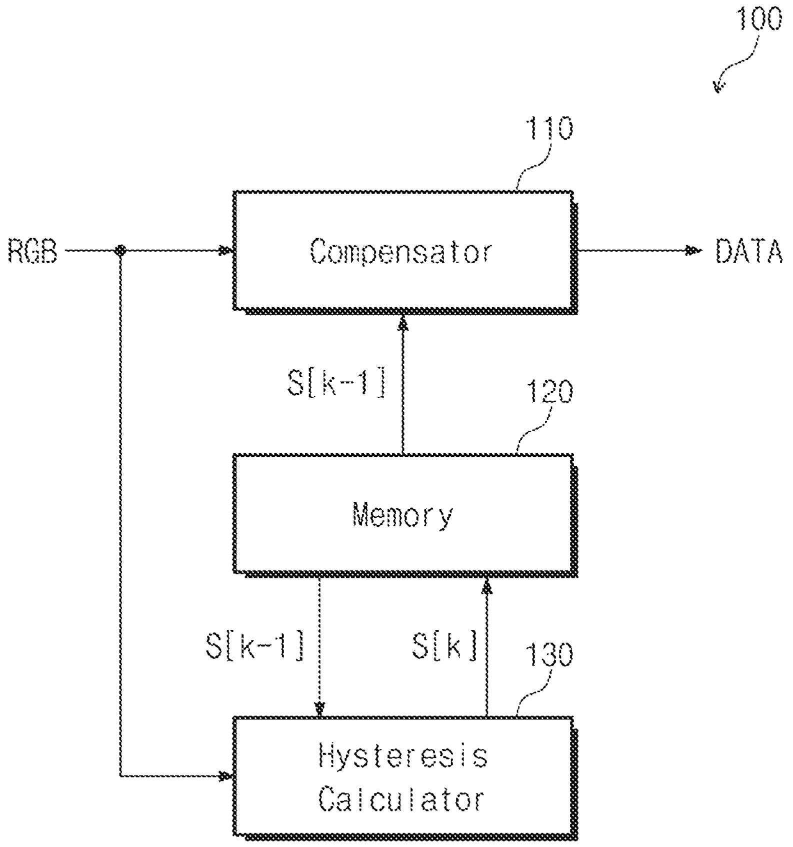
FIG. 6 is a block diagram of an embodiment of a driving controller according to the invention.

FIG. 6 is a block diagram of an embodiment of a driving controller according to the invention.

Referring to FIG. 6, a driving controller 100 may include a compensator 110, a memory 120, and a hysteresis calculator 130.

The hysteresis calculator 130 may calculate a current hysteresis state value S[k] of a current frame based on an image signal RGB and a previous hysteresis state value S[k−1] of a previous frame, which is stored in the memory 120, and may store the current hysteresis state value S[k] in the memory 120.

The compensator 110 may compensate for the image signal RGB based on the previous hysteresis state value S[k−1] stored in the memory 120 and may output an image data signal DATA.

Figures 7, 8:
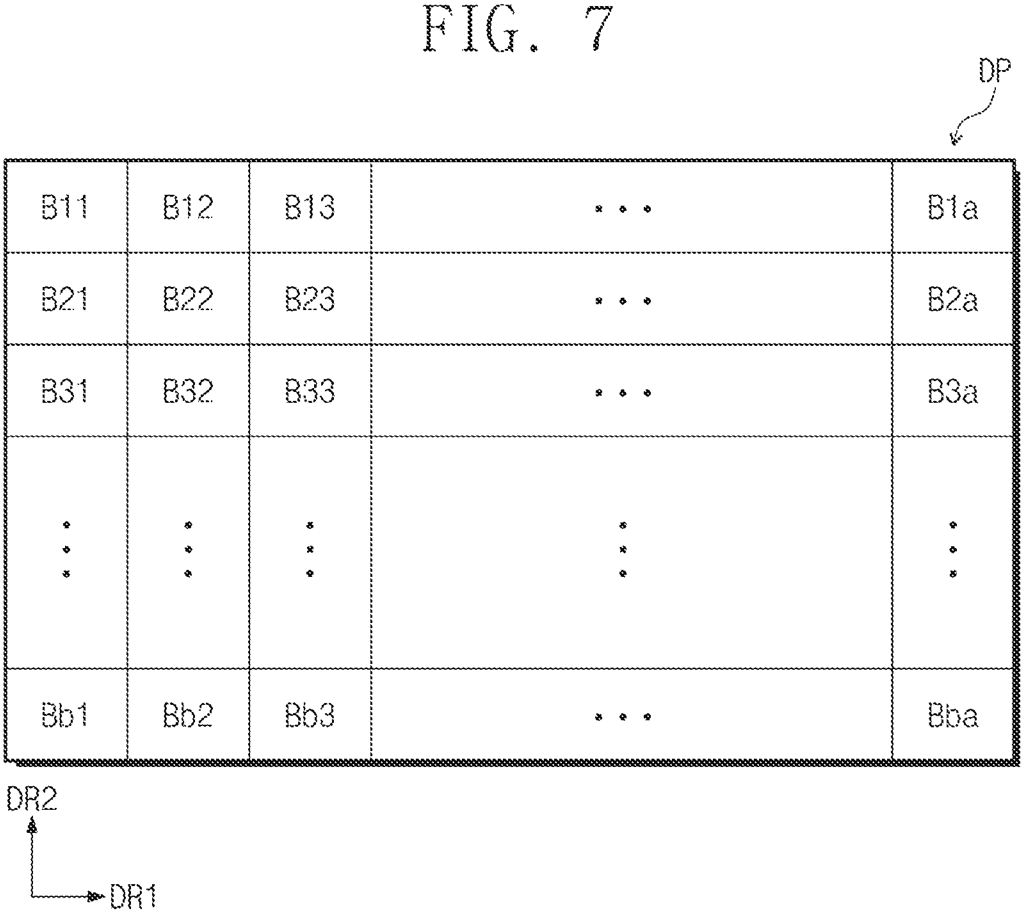
FIG. 7 is a drawing illustrating dividing a display panel into a plurality of blocks.
FIG. 8 is a drawing illustrating a current hysteresis state value stored in a memory.

FIG. 7 is a drawing illustrating dividing a display panel into a plurality of blocks.

Referring to FIGS. 6 and 7, a hysteresis calculator 130 may calculate a current hysteresis state value S[k] corresponding to each of pixels PX shown in FIG. 1. However, when a display panel DP (refer to FIG. 1) is large in size, the number of pixels PX increases. Thus, a memory 120 for storing the current hysteresis state value S[k] is desired to be large in size.

The hysteresis calculator 130 may divide the display panel DP into a plurality of blocks B11-B1*a*, B21-B2*a*, B31-B3*a*, . . . , Bb1-Bba (where each of "a" and "b" is a natural number) and may calculate a current hysteresis state value S[k] for each block. Each of the plurality of blocks B11-B1*a*, B21-B2*a*, B31-B3*a*, . . . , Bb1-Bba may include the plurality of pixels PX.

The hysteresis calculator 130 may calculate a representative value corresponding to each of the blocks B11-B1*a*, B21-B2*a*, B31-B3*a*, Bb1-Bba in the image signal RGB and may calculate a current hysteresis state value S[k] based on the representative value and a previous hysteresis state value S[k−1].

In an embodiment, the hysteresis calculator 130 may calculate a current hysteresis state value S[k] corresponding to the block B11 based on a representative value corresponding to the block B11 in the image signal RGB and a previous hysteresis state value S[k−1] corresponding to the block B11, for example.

A representative value corresponding to each of the blocks B11-B1*a*, B21-B2*a*, B31-B3*a*, Bb1-Bba in the image signal RGB may be selected as a value, such as a mean, a median, or a mode, which is capable of well indicating characteristics of the blocks B11-B1*a*, B21-B2*a*, B31-B3*a*, . . . , Bb1-Bba.

FIG. 8 is a drawing illustrating a current hysteresis state value stored in a memory.

a memory 120 may store a current hysteresis state value S[k] corresponding to each of blocks B11-B1*a*, B21-B2*a*, B31-B3*a*, Bb1-Bba from a address Addr to a ((b×a)−1)-th address Addr.

In an embodiment, pixels PX may include first to third color pixels. The first to third color pixels may include a red pixel, a green pixel, and a blue pixel. The current hysteresis state value S[k] may include state values respectively corresponding to the first to third color pixels. In an embodiment, the current hysteresis state value S[k] stored in the 0th address Addr of the memory 120 may include a current hysteresis state value B11_R of the first color pixel corresponding to the block B11, a current hysteresis state value B11_G of the second color pixel, and a current hysteresis state value B11_B of the third color pixel, for example.

In an embodiment, the current hysteresis state value S[k] may have a minimum bit width in a range where a user is unable to recognize a luminance difference. In an embodiment, when a bit width of the first color pixel in the image signal RGB is 8 bits, the current hysteresis state value B11_R of the first color pixel may have a bit width smaller than 8 bits, for example. In an embodiment, the current hysteresis state value B11_R of the first color pixel may be 6 bits, for example. As such, the memory 120 may be minimized in size by reducing the bit width of the current hysteresis state value S[k].

FIG. 9 illustrates a first lookup table used by a hysteresis calculator.

Referring to FIGS. 6 and 9, a hysteresis calculator 130 may include a first lookup table LUT1. The hysteresis calculator 130 may output a current hysteresis state value S[k] corresponding to an image signal RGB and a previous hysteresis state value S[k−1] with reference to the first lookup table LUT1.

In an embodiment, each of the image signal RGB, the previous hysteresis state value S[k−1], and the current hysteresis state value S[k] may refer to a gray scale level.

In an embodiment, the previous hysteresis state value S[k−1] may be gray scale level 63, the image signal RGB may be gray scale level 191, and the current hysteresis state value S[k] may be gray scale level 76, for example.

Current hysteresis state values S[k] are shown in FIG. 9, when the image signal RGB has gray scale levels 63, 127, 191, and 255 and when the previous hysteresis state value S[k−1] has gray scale levels 0, 63, 127, 191, and 255. In an embodiment, the image signal RGB may correspond to any one among from gray scale level 0 to gray scale level 255. The first lookup table LUT1 may include the image signal RGB, the previous hysteresis state value S[k−1], and the current hysteresis state value S[k] respectively corresponding to all gray scale levels from gray scale level 0 to gray scale level 255.

In an embodiment, the first lookup table LUT1 may include the image signals RGB respectively corresponding to some gray scale levels among from gray scale level 0 to gray scale level 255 and may include the previous hysteresis state values S[k−1] respectively corresponding to some gray scale levels from gray scale level 0 to gray scale level 255 and the current hysteresis state values S[k] according to the previous hysteresis state values S[k−1]. In this case, the hysteresis calculator 130 may calculate the current hysteresis state value S[k] by means of interpolation calculation.

The image signal RGB, the previous hysteresis state value S[k−1], and the current hysteresis state value S[k] described in the first lookup table LUT1 shown in FIG. 9 are merely illustrative, and the invention is not limited thereto.

The hysteresis calculator 130 may calculate the current hysteresis state value S[k] using calculation of the image signal RGB and the previous hysteresis state value S [k−1] without using the first lookup table LUT1 shown in FIG. 9.

The current hysteresis state value S[k] may be calculated by Equation 1 below.

$$S[k]=(RGB\times p1)+(S[k-1]\times p2) \quad \text{[Equation 1]}$$

In Equation 1 above, p1 denotes the first weight and p2 denotes the second weight.

Equation 1 above is only an example for calculating the current hysteresis state value S[K], and the invention is not limited thereto.

FIG. 10 illustrates a second lookup table used by a compensator.

Referring to FIGS. 6 and 10, a compensator 110 may include a second lookup table LUT2. The compensator 110 may output a compensation value CV corresponding to an image signal RGB and a previous hysteresis state value S[k−1] with reference to the second lookup table LUT2.

In an embodiment, each of the image signal RGB and the previous hysteresis state value S [k−1] may refer to a gray scale level.

In an embodiment, the previous hysteresis state value S[k−1] may be gray scale level 63, the image signal RGB may be gray scale level 191, and the compensation value CV may be −1.5, for example.

The compensation value CV is shown in FIG. 10, when the image signal RGB has gray scale levels 63, 127, 191, and 255 and when the previous hysteresis state value S[k−1] has gray scale levels 0, 63, 127, 191, and 255. In an embodiment, the image signal RGB may correspond to any one among from gray scale level 0 to gray scale level 255. The second lookup table LUT2 may include the image signal RGB, the previous hysteresis state value S[k−1], and the compensation values CV respectively corresponding to all of gray scale levels from gray scale level to gray scale level 255.

In an embodiment, the second lookup table LUT2 may include the image signals RGB respectively corresponding to some gray scale levels among from gray scale level 0 to gray scale level 255 and may include the previous hysteresis state values S[k−1] respectively corresponding to some gray scale levels from gray scale level 0 to gray scale level 255 and the compensation values CV according to the previous hysteresis state values S[k−1]. In this case, the compensator 110 may calculate the compensation value CV by means of interpolation calculation.

The image signal RGB, the previous hysteresis state value S[k−1], and the compensation value CV described in the second lookup table LUT2 shown in FIG. 10 are merely illustrative, and the invention is not limited thereto.

The compensator 110 may calculate the compensation value CV obtained by the second lookup table LUT2 and the image signal RGB to output an image data signal DATA. In an embodiment, the compensator 110 may output the image data signal DATA by adding the compensation value CV to the image signal RGB.

In an embodiment, the previous hysteresis state value S[k−1] may be gray scale level 63, the image signal RGB may be gray scale level 191, and the compensation value CV may be −1.5, for example. The compensator 110 may output gray scale level 189.5 obtained by adding the image signal RGB to the compensation value CV as the image data signal DATA.

Figures 11, 12:
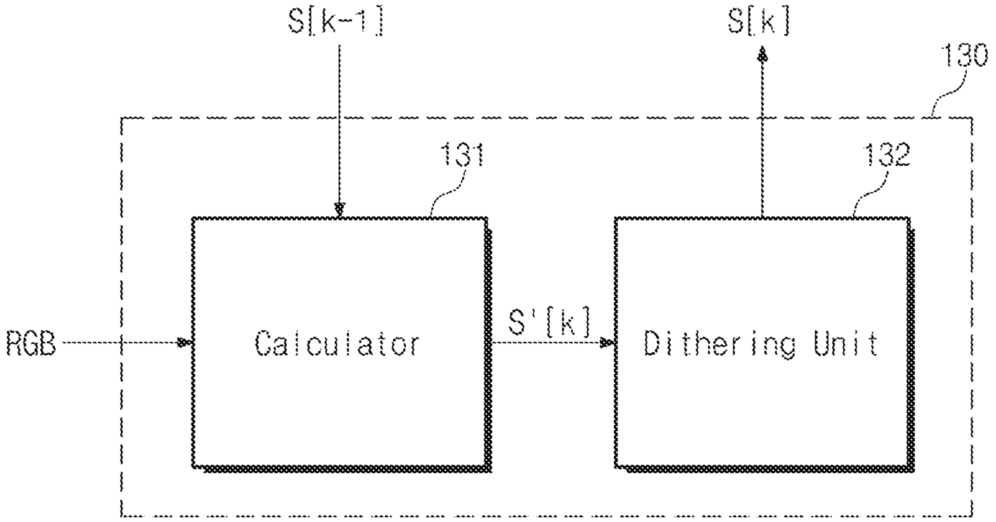
FIG. 11 is a block diagram illustrating a hysteresis calculator.
FIG. 12 illustrates a third lookup table used by a calculator shown in FIG. 11.

FIG. 11 is a block diagram illustrating a hysteresis calculator.

FIG. 12 is a drawing illustrating a third lookup table used by a calculator shown in FIG. 11.

Referring to FIGS. 11 and 12, a hysteresis calculator 130 may include a calculator 131 and a dithering unit 132.

The calculator 131 may output a state value S'[k] based on an image signal RGB and a previous hysteresis state value S[k−1]. The state value S'[k] output from the calculator 131 may be a number including a decimal point.

The calculator 131 may output the state value S'[k] corresponding to the image signal RGB and the previous hysteresis state value S[k−1] with reference to the third lookup table LUT3. Although the image signal RGB and the previous hysteresis state value S[k−1] are integers, the state value S'[k] may include a decimal. A memory 120 is desired to increase in size to store a number less than "1", that is, a decimal in the memory 120.

The dithering unit 132 may perform dithering calculation for the state value S'[k] and may output the current hysteresis state value S[k].

Figure 13:
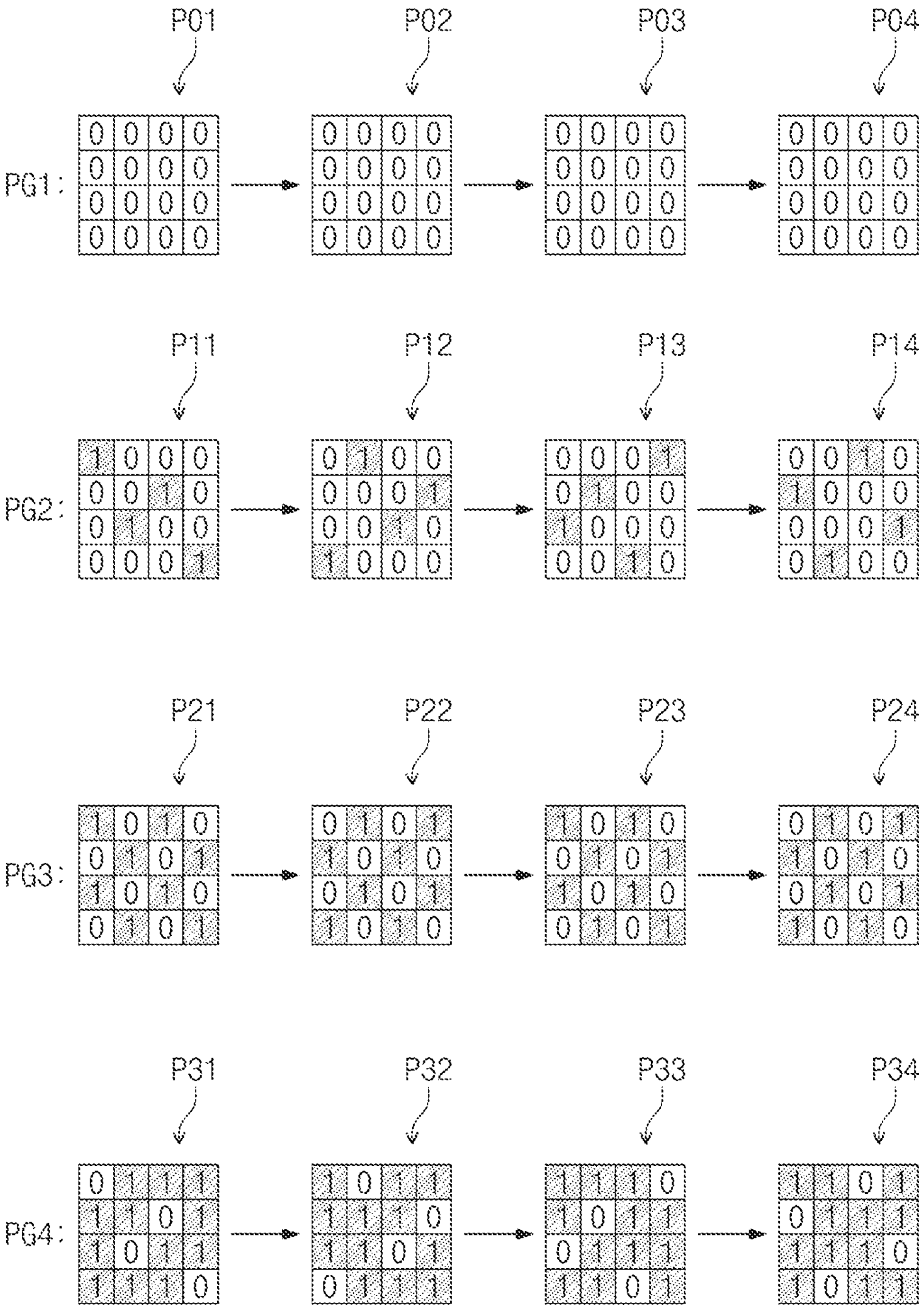
FIG. 13 is a drawing illustrating an operation of a dithering unit of a hysteresis calculator.

FIG. 13 is a drawing illustrating an operation of a dithering unit of a hysteresis calculator.

Referring to FIGS. 11 to 13, a dithering unit 132 may include a plurality of dither patterns, each of which has a c×d size (where each of "c" and "d" is a natural number). In an embodiment, the dithering unit 132 may dither a state value S'[k] using dither patterns P01-P04, P11-P14, P21-P24, and P31-P34, each of which has a 4×4 size. The dither patterns P01-P04, P11-P14, P21-P24, P31-P34, each of which has the 4×4 size, may each correspond to 4×4 pixels. In other words, one dither pattern of the 4×4 size corresponds to 4×4 pixels. As described above with reference to FIG. 7, when the state value S'[k] corresponds to each of blocks B11-B1*a*, B21-B2*a*, B31-B3*a*, Bb1-Bba, one dither pattern of the 4×4 size may correspond to 4×4 blocks.

The dithering unit 132 may adopt dither patterns P01-P04, P11-P14, P21-P24, and P31-P34 of first to fourth groups PG1 to PG4 in which the position of "1" is distributed in a spatial distribution scheme and adopts a temporal distribution scheme of alternately outputting the dither patterns P01-P04, P11-P14, P21-P24, and P31-P34 in any one group among the first to fourth group PG1 to PG4 every frame.

The dithering unit 132 may select the dither patterns P01-P04, P11-P14, P21-P24, and P31-P34 of the first to fourth groups PG1 to PG4 depending on a value (i.e., a decimal) after a decimal point of the state value S'[k]. In an embodiment, the dithering unit 132 may use the dither patterns P01-P04 of the first group PG1, when the decimal of the state value S'[k] is greater than or equal to 0 and is less than 0.25, may use the dither patterns P11-P14 of the second group PG2, when the decimal is greater than or equal to 0.25 and is less than 0.5, may use the dither patterns P21-P24 of the third group PG3, when the decimal is greater than or equal to and is less than 0.75, and may use the dither patterns P31-P34 of the fourth group PG4, when the decimal is greater than or equal to 0.75 and is less than 1. The dithering unit 132 may increase an integer except for the decimal of the state value S'[k] by "1", when the dither pattern selected among the dither patterns P11-P14, P21-P24, and P31-P34 of the second to fourth groups PG2 to PG4 is "1" and outputs the increased integer as a current hysteresis state value S[k], and may output an integer except for the decimal of the state value S'[k], when the selected dither pattern is "0", as the current hysteresis state value S[k] without change.

In an embodiment, when the state value S'[k] is 126.25, the dithering unit 132 may sequentially output 127, 126, 126, and 126 as the current hysteresis state values S[k] in four consecutive frames, for example. The average of the current hysteresis state values S[k] may be 126.25 during the four frames.

As the hysteresis calculator 130 includes the dithering unit 132, it may minimize a quantization error while outputting the current hysteresis state value S[k] which is an integer. The dither patterns P01-P04, P11-P14, P21-P24, and P31-P34 may be changed in number and size in various manners.

Figure 14:
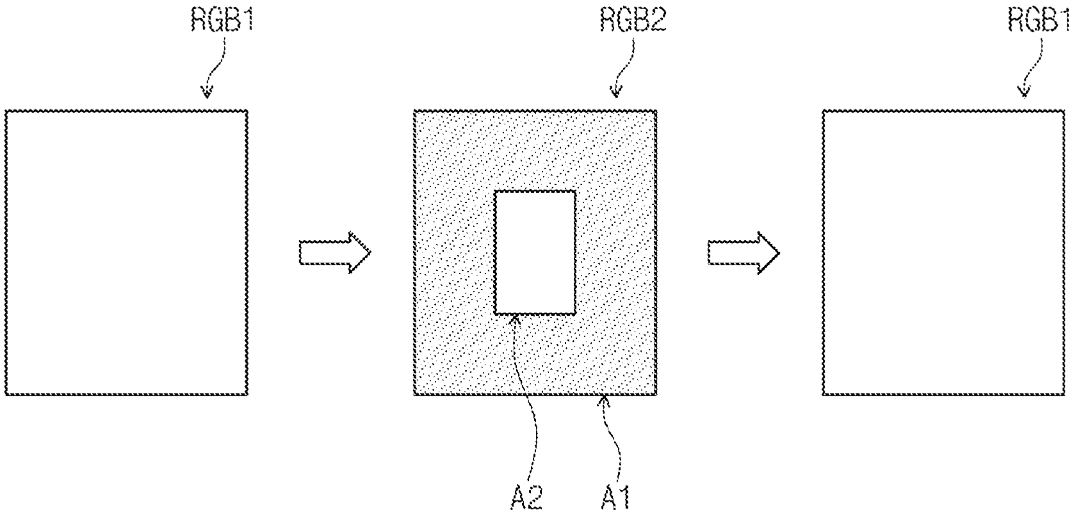
FIG. 14 illustrates image patterns input to a display device.

FIG. 14 illustrates image patterns input to a display device.

FIGS. 15A and 15B are drawings illustrating a previous hysteresis state value S[k−1], a current hysteresis state value S[k], and an image data signal DATA according to an image signal RGB input to a display device.

First of all, referring to FIGS. 6, 14, and 15A, an image signal RGB corresponding to a first image pattern RGB1 may be provided to a driving controller 100. The first image pattern RGB1 may be a pattern where all pixels PX of a display panel DP display an image of gray scale level 16.

When the image corresponding to the first image pattern RGB1 is displayed on the display panel DP for a long time, each of a previous hysteresis state value S[k−1], a current hysteresis state value S[k], and an image data signal DATA in a fth frame may correspond to gray scale level 16.

An image signal RGB corresponding to a second image pattern RGB2 may be provided to the driving controller 100 from 1 second to 10 seconds from the fth frame, that is, from a (f+60)-th frame to a (f+600)-th frame. The second image pattern RGB2 may be a pattern where pixels PX of a first area A1 of the display panel DP display an image of gray scale level 0 and where pixels PX of a second area A2 display an image of gray scale level 128.

A hysteresis calculator 130 may calculate a current hysteresis state value S[k] based on an image signal RGB and a previous hysteresis state value S[k−1].

A compensator 110 may output an image data signal DATA based on the image signal RGB and the previous hysteresis state value S[k−1].

In the embodiment shown in FIG. 15A, while the image corresponding to the second image pattern RGB2 is displayed on the display panel DP, that is, from a (f+60 h)-th frame to a (f+600)-th frame, the previous hysteresis state value S[k−1] corresponding to the pixels PX of the first area A1 may sequentially change to 16, 15, 14, . . . , 9, the current hysteresis state value S[k] may sequentially change to 15, 14, 13, . . . , 8, and the image data signal DATA may be maintained as “0”.

The image signal RGB corresponding to the first image pattern RGB1 in a (f+660)-th frame may be provided to the driving controller 100 again. The first image pattern RGB1 may be a pattern where all pixels PX of the display panel DP display an image of gray scale level 16.

In the embodiment shown in FIG. 15A, while the image corresponding to the first image pattern RGB1 is displayed on the display panel DP in the (f+660)-th frame and a (f+720)-th frame, the previous hysteresis state value S [k−1] corresponding to the pixels PX of the first area A1 may sequentially change to 8 and 9, the current hysteresis state value S[k] may sequentially change to 9 and 10, and the image data signal DATA may change to 14 and 15.

Referring to FIGS. 1, 6, 14, and 15B, while the image corresponding to the second image pattern RGB2 is displayed on the display panel DP, that is, from the (f+60)-th frame to the (f+600)-th frame, the previous hysteresis state value S[k−1] corresponding to the pixels PX of the second area A2 may sequentially change to 16, 23, 30, . . . , 66, the current hysteresis state value S[k] may sequentially change to 23, 36, . . . , 70, and the image data signal DATA may sequentially change to 124, 125, 126, . . . , 127.

Furthermore, while the image corresponding to the first image pattern RGB1 is displayed on the display panel DP in the (f+660)-th frame and the (f+720)-th frame, the previous hysteresis state value S[k−1] corresponding to the pixels PX of the second area A2 may sequentially change to 70 and 66, the current hysteresis state value S[k] may sequentially change to 66 and 62, and the image data signal DATA may change to 18 and 17.

As shown in FIG. 15A, when the image signal RGB changes from gray scale level 16 to gray scale level 0, a hysteresis characteristic change in a transistor T1 shown in FIG. 2 is not large. Therefore, the image data signal DATA provided to the pixel PX may be the same as the image signal RGB. The image data signal DATA may sequentially change to 14 and 15 to compensate for the hysteresis characteristic of the transistor T1 when the image signal RGB is displayed at gray scale level 0 for a long time (10 seconds in the embodiment shown in FIG. 15A) and then changes to gray scale level 16.

As shown in FIG. 15B, the image data signal DATA provided to the pixel PX may sequentially change to 124, 125, 126, and 127 to compensate for the hysteresis characteristic of the transistor T1 shown in FIG. 2 when the image signal RGB changes from gray scale level 16 to gray scale level 128. Furthermore, the image data signal DATA may sequentially change to 18 and 17 to compensate for the hysteresis characteristic of the transistor T1 when the image signal RGB is displayed at gray scale level 128 for a long time (10 seconds in the embodiment shown in FIG. 15A) and then changes to gray scale level 16.

FIGS. 15A and 15B illustrate changes in previous hysteresis state value S[k−1] and current hysteresis state value S[k] every 1 second, that is, 60 frames. In an embodiment, when the current frame is a frame between an (f+120)-th frame and an (f+179)-th frame, a previous frame is an (f+60)-th frame. In other words, the compensator 110 may output an image data signal DATA of the current frame using the previous hysteresis state value S[k−1] of the (f+60)-th frame for frames between the (f+120)-th frame and the (f+179)-th frame, for example.

Change periods of the previous hysteresis state value S[k−1] and the current hysteresis state value S[k] are not limited to FIGS. 15A and 15B. In an embodiment, the previous hysteresis state value S[k−1] and the current hysteresis state value S[k] may be updated every frame, or the previous hysteresis state value S[k−1] and the current hysteresis state value S[k] may be updated every a few frames or dozens of frames, for example.

Figure 16A:
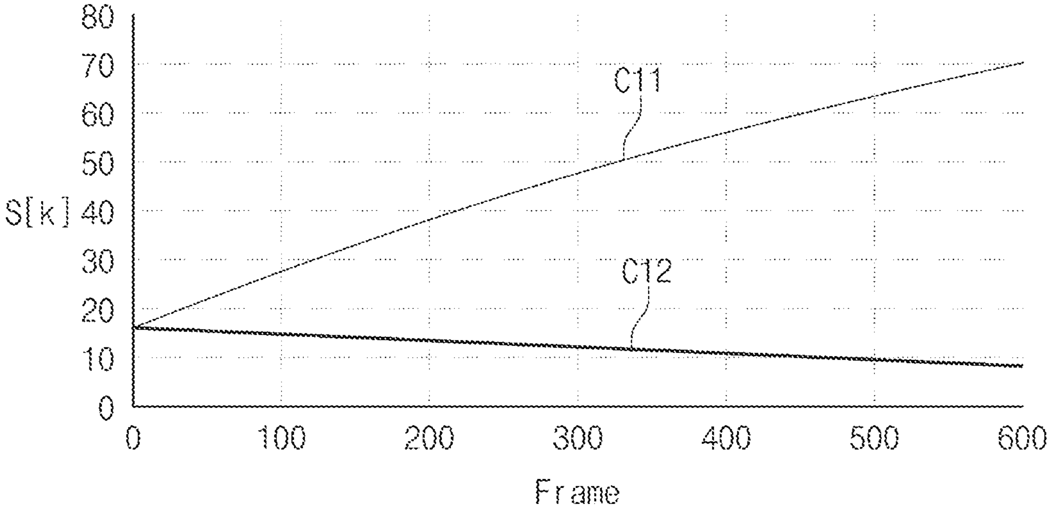
FIG. 16A illustrates updating a current hysteresis state value every frame when an input image signal changes from gray scale level 16 to gray scale level 128 and when the input image signal changes from gray scale level 16 to gray scale level 0.

FIG. 16A illustrates updating a current hysteresis state value every frame when an input image signal changes from gray scale level 16 to gray scale level 128 and when the input image signal changes from gray scale level 16 to gray scale level 0.

Figure 16B:
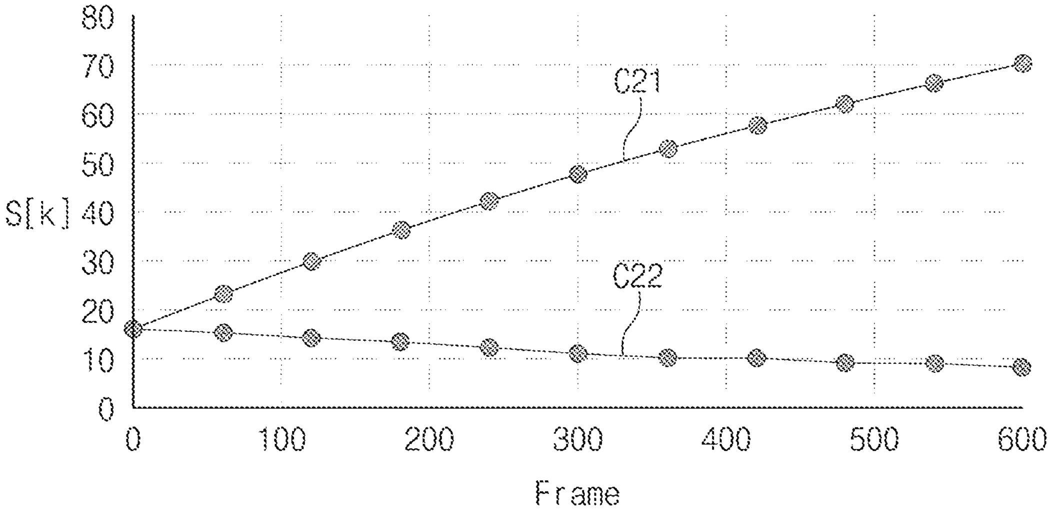
FIG. 16B illustrates updating a current hysteresis state value every one second when an input image signal changes from gray scale level 16 to gray scale level 128 and when the input image signal changes from gray scale level 16 to gray scale level 0.

FIG. 16B illustrates updating a current hysteresis state value every one second when an input image signal changes from gray scale level 16 to gray scale level 128 and when the input image signal changes from gray scale level 16 to gray scale level 0.

Referring to FIGS. 6 and 16A, a curve C11 shows that a hysteresis calculator 130 updates a current hysteresis state value S[k] every frame when an input image signal RGB changes from gray scale level 16 to gray scale level 128 in a first frame. A curve C12 shows that the hysteresis calculator 130 updates the current hysteresis state value S[k] every frame when the input image signal RGB changes from gray scale level 16 to gray scale level 0 in the first frame.

Referring to FIGS. 6 and 16B, a curve C21 shows that the hysteresis calculator 130 updates the current hysteresis state value S[k] every 1 second (i.e., every 60 frames) when the input image signal RGB changes from gray scale level 16 to gray scale level 128 in the first frame. The curve C22 shows that the hysteresis calculator 130 updates the current hysteresis state value S[k] every 1 second when the input image signal RGB changes from gray scale level 16 to gray scale level 0 in the first frame.

Referring to FIGS. 6, 16A, and 16B, it may be seen that the current hysteresis state value S[k] when the hysteresis calculator 130 updates the current hysteresis state value S[k] every frame is similar to the current hysteresis state value S[k] when the hysteresis calculator 130 updates the current hysteresis state value S[k] every 1 second. The hysteresis calculator 130 may calculate the current hysteresis state value S[k] on a periodic basis (e.g., 1 second) based on the image signal RGB and the previous hysteresis state value S[k−1].

In an embodiment, the hysteresis calculator 130 may calculate the current hysteresis state value S[k], when there is a predetermined event as well as a predetermined period. In an embodiment, when a gray scale level difference between the image signal RGB of the previous frame and the image signal RGB of the current frame is greater than a reference value, the hysteresis calculator 130 may calculate the current hysteresis state value S[k] based on the image signal RGB and a previous hysteresis state value S[k−1], for example.

In an embodiment, the hysteresis calculator 130 may vary an update period when the current hysteresis state value S[k] is calculated. In an embodiment, a display device DD may operate in a frequency variable mode of decreasing a driving frequency when the image signal RGB is a still image and increasing a driving frequency when the image signal RGB is a moving image, for example. The hysteresis calculator 130 may change a period for updating the current hysteresis state value S[k] when the driving frequency is low to be long (e.g., 5 seconds).

Figure 17:
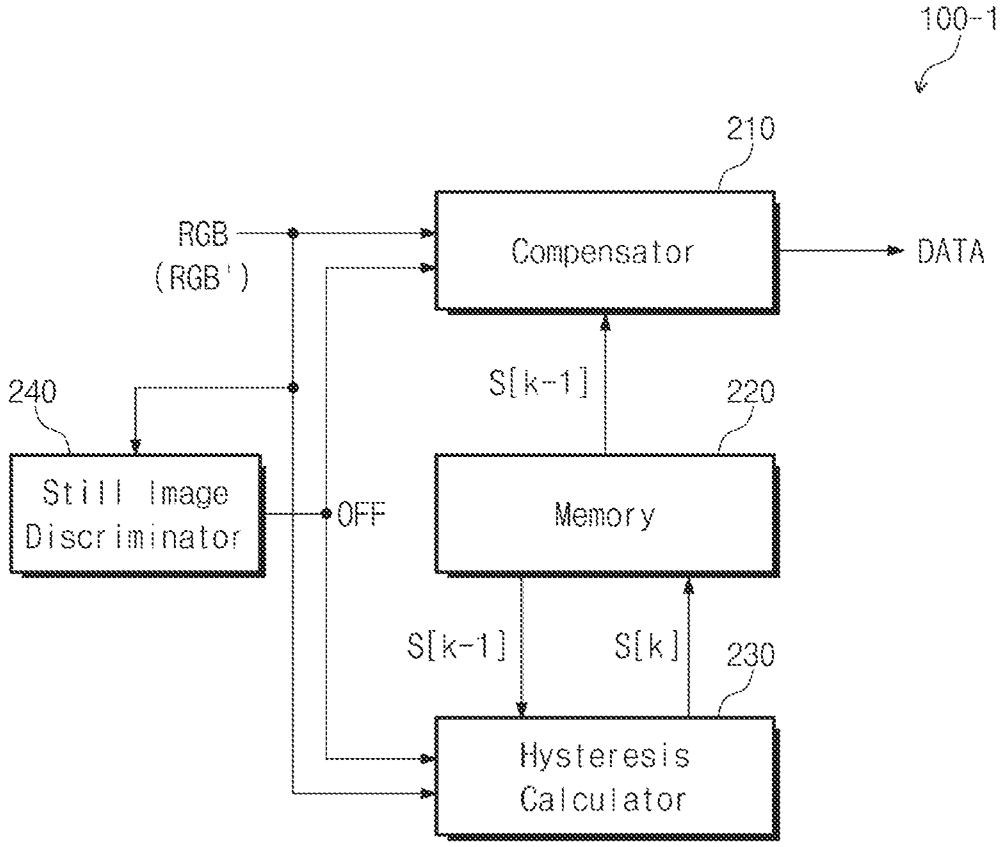
FIG. 17 is a block diagram of an embodiment of a driving controller according to the invention.

FIG. 17 is a block diagram of an embodiment of a driving controller according to the invention.

Referring to FIG. 17, a driving controller 100-1 may include a compensator 210, a memory 220, a hysteresis calculator 230, and a still image discriminator 240. Because the compensator 210, the memory 220, and the hysteresis calculator 230 shown in FIG. 17 operate to be similar to a compensator 110, a memory 120, and a hysteresis calculator 130 shown in FIG. 6, a duplicated description thereof will be omitted.

The still image discriminator 240 may compare an image signal RGB of a current frame with an image signal RGB' of a previous frame to determine whether the image signal RGB of the current frame is a still image signal. When the image signal RGB of the current frame is identical to the image signal RGB' of the previous frame during a predetermined time, the still image discriminator 240 may determine the image signal RGB of the current frame as a still image signal.

When it is determined that the image signal RGB of the current frame is the still image signal, the still image discriminator 240 may output an off-signal OFF of an active level. When the off-signal OFF has the active level, the compensator 210 and the hysteresis calculator 230 may stop the operation.

Because an image sticking phenomenon by a hysteresis characteristic of a first transistor T1 shown in FIG. 2 does not occur when the image signal RGB of the current frame is the still image signal, a compensation operation is unnecessary. As the compensator 210 and the hysteresis calculator 230 stop, power consumption of the driving controller 100-1 may be reduced.

Figure 18:
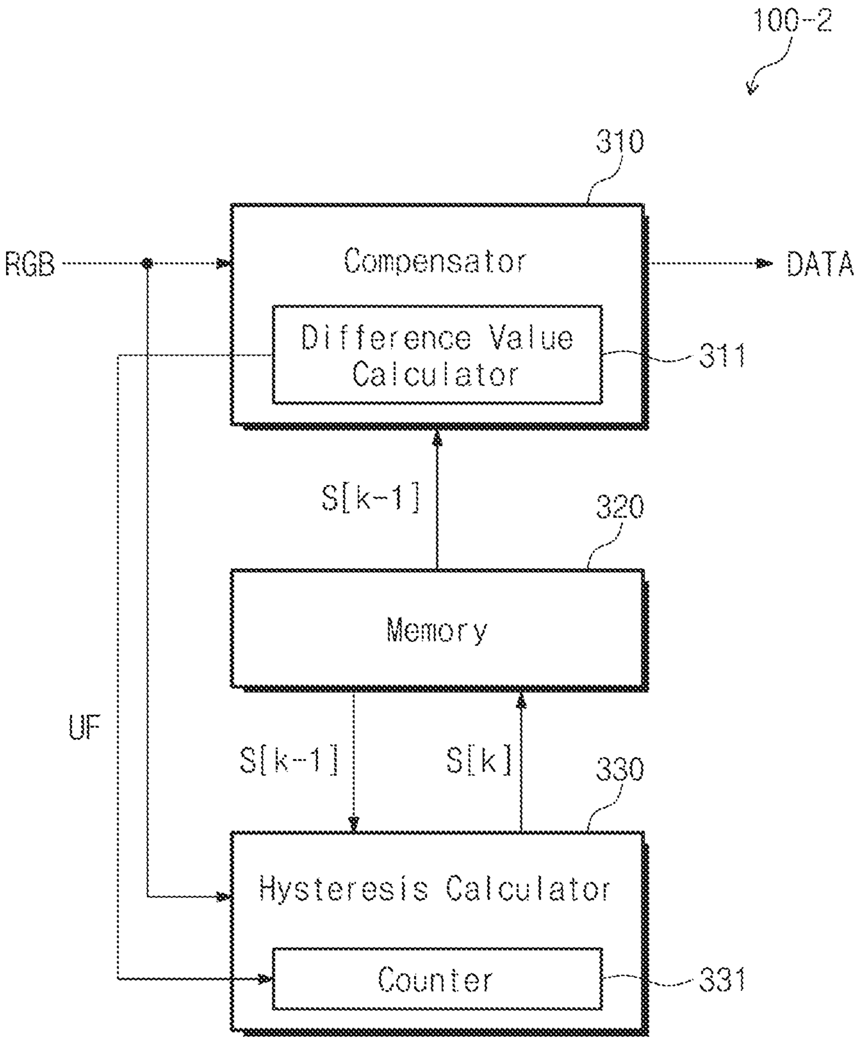
FIG. 18 is a block diagram of an embodiment of a driving controller according to the invention.

FIG. 18 is a block diagram of an embodiment of a driving controller according to the invention.

Referring to FIG. 18, a driving controller 100-2 may include a compensator 310, a memory 320, and a hysteresis calculator 330. Because the compensator 310, the memory 320, and the hysteresis calculator 330 shown in FIG. 18 operate to be similar to a compensator 110, a memory 120, and a hysteresis calculator 130 shown in FIG. 6, a duplicated description thereof will be omitted.

The compensator 310 may include a difference value calculator 311. The difference value calculator 311 may calculate a difference value between an image signal RGB and a previous hysteresis state value S[k−1] from the memory 320.

The difference value calculator 311 may calculate the difference value between the image signal RGB corresponding to each of pixels PX (refer to FIG. 1) and the previous hysteresis state value S[k−1]. When the number of difference values greater than a reference value among the calculated difference values is greater than or equal to a predetermined number, the difference value calculator 311 may activate an update-flag signal UF to an active level.

The hysteresis calculator 330 includes a counter 331. The counter 331 may be synchronized to the update-flag signal UF of the active level to count up.

As shown in FIG. 16B, the hysteresis calculator 330 may calculate a current hysteresis state value S[k] based on the image signal RGB and the previous hysteresis state value S[k−1] every 1 second (60 frames).

In the embodiment shown in FIG. 16B, the hysteresis calculator 330 may fail to calculate the current hysteresis state value S[k] from a 61st frame to a 119th frame. When the update-flag signal UF transitions to an active level in a 70th frame, the hysteresis calculator 330 may calculate a current hysteresis state value S[k] based on the image signal RGB and the previous hysteresis state value S[k−1].

In other words, when the difference value between the image signal RGB and the previous hysteresis state value S[k−1] is large, the hysteresis calculator 330 may ignore a predetermined period (e.g., 1 second) and may calculate the current hysteresis state value S[k].

Furthermore, as the count value of the counter 331 increases, the hysteresis calculator 330 may output a value obtained by adding a predetermined weight to a current hysteresis state value S[k] of a first lookup table LUT1 shown in FIG. 9 as the current hysteresis state value S[k].

In an embodiment, the hysteresis calculator 330 may further include a lookup table different from the first lookup table LUT1 and may output a current hysteresis state value S[k] with reference to the lookup table corresponding to the count value of the counter 331.

In an embodiment, the hysteresis calculator 330 may calculate the current hysteresis state value S[k] by Equation 1 above. As the count value of the counter 331 increases, the hysteresis calculator 330 may change a first weight p1 and a second weight p2 of Equation 1 above.

In an embodiment, the difference value calculator 311 in the compensator 310 may calculate a difference value between an image signal RGB of a current frame and an image signal RGB of a previous frame. When the number of difference values greater than a reference value among the calculated difference values is greater than or equal to a predetermined number, the difference value calculator 311 may activate an update-flag signal UF to an active level. In an embodiment, the compensator 310 may further include a buffer memory for storing the image signal RGB of the previous frame. In an embodiment, the compensator 310 may store the image signal RGB of the previous frame in the memory 320, and the difference value calculator 311 may calculate a difference value between the image signal RGB of the current frame and the image signal RGB of the previous frame, which is stored in the memory 320.

In an embodiment, the difference value calculator 311 in the compensator 310 may calculate the sum of the difference value between the image signal RGB corresponding to each of pixels PX (refer to FIG. 1) and the previous hysteresis state value S[k−1]. When the sum of the calculated difference values is greater than a reference value, the difference value calculator 311 may activate the update-flag signal UF to the active level.

Figure 19:
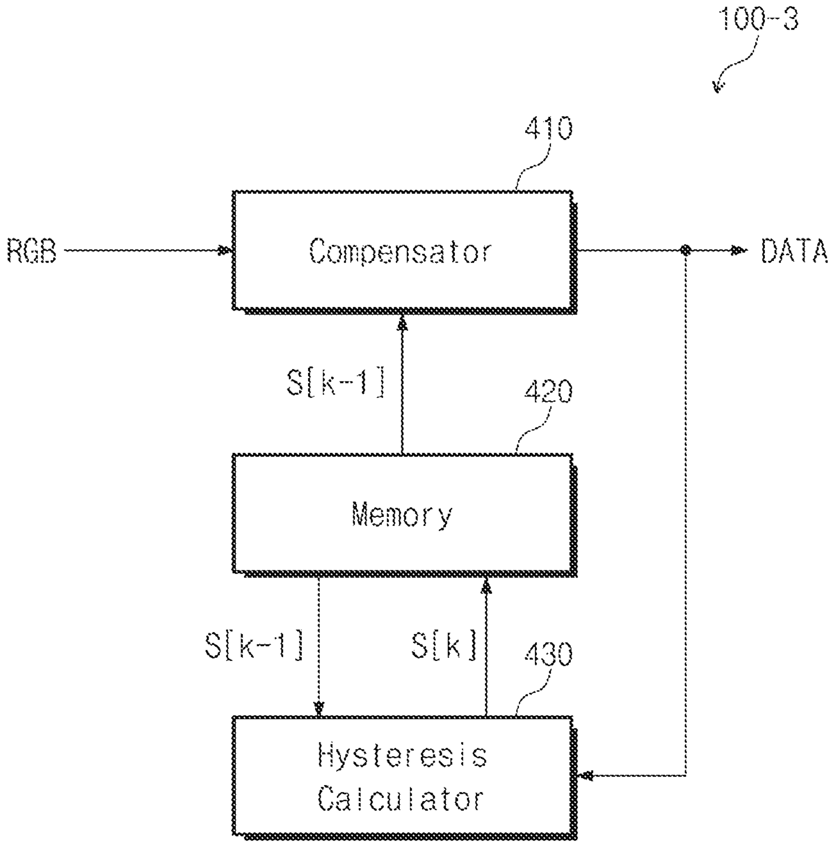
FIG. 19 is a block diagram of an embodiment of a driving controller according to the invention.

FIG. 19 is a block diagram of an embodiment of a driving controller according to the invention.

Referring to FIG. 19, a driving controller 100-3 may include a compensator 410, a memory 420, and a hysteresis calculator 430. Because the compensator 410, the memory 420, and the hysteresis calculator 430 shown in FIG. 19 operate to be similar to a compensator 110, a memory 120, and a hysteresis calculator 130 shown in FIG. 6, a duplicated description thereof will be omitted.

The hysteresis calculator 430 may calculate a current hysteresis state value S[k] based on an image data signal DATA and a previous hysteresis state value S[k−1] from the memory 420.

Figure 20:
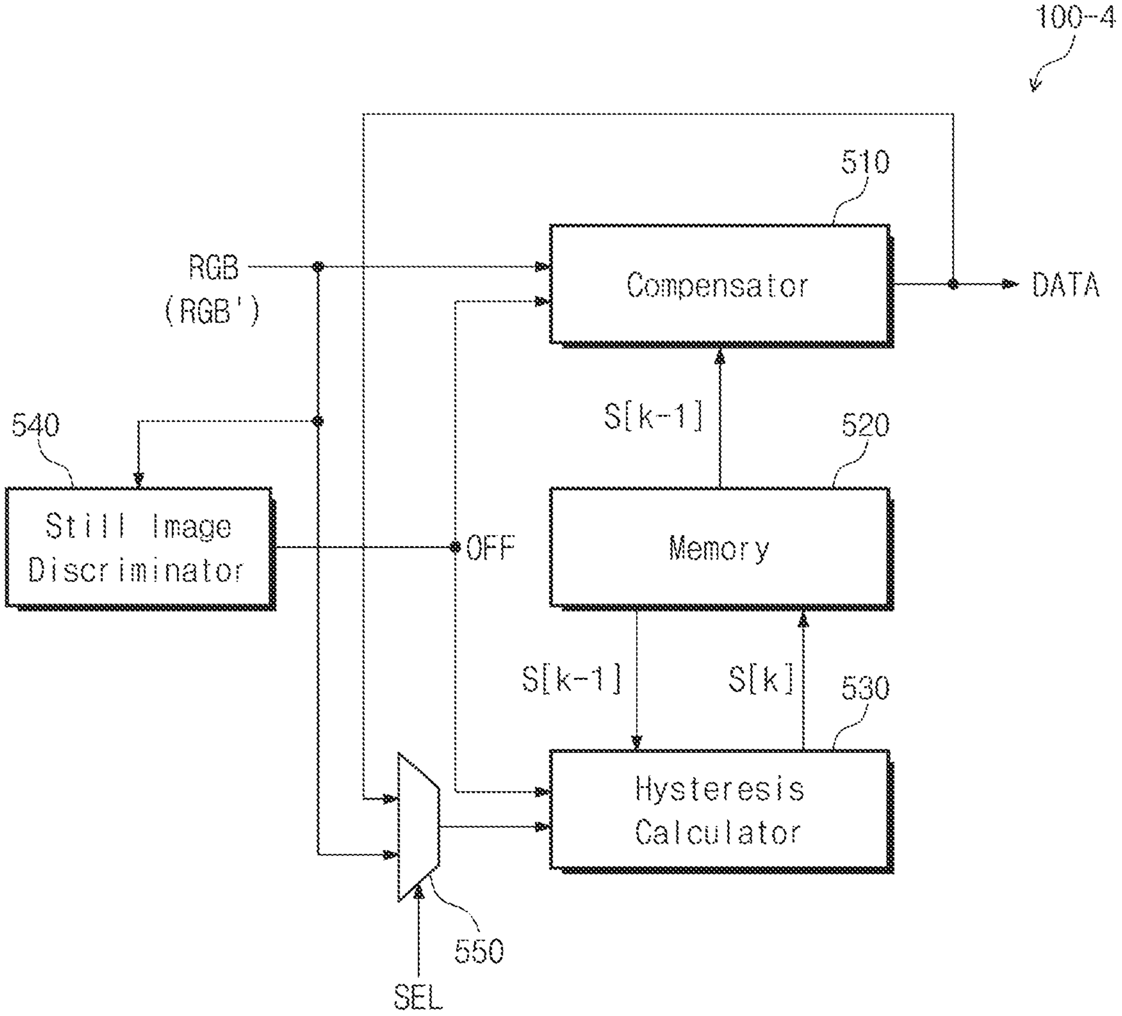
FIG. 20 is a block diagram of an embodiment of a driving controller according to the invention.

FIG. 20 is a block diagram of an embodiment of a driving controller according to the invention.

Referring to FIG. 20, a driving controller 100-4 may include a compensator 510, a memory 520, a hysteresis calculator 530, a still image discriminator 540, and a multiplexer 550. Because the compensator 510, the memory 520, the hysteresis calculator 530, and the still image discriminator 540 shown in FIG. 20 operate to be similar to a compensator 210, a memory 220, a hysteresis calculator 230, and a still image discriminator 240 shown in FIG. 17, a duplicated description thereof will be omitted.

The multiplexer 550 may output any one of an image signal RGB and an image data signal DATA as an output signal in response to a selection signal SEL.

The hysteresis calculator 530 may calculate a current hysteresis state value S[k] based on the output signal provided from the multiplexer 550 and a previous hysteresis state value S [k−1] from the memory 520.

The still image discriminator 540 may compare an image signal RGB of a current frame with an image signal RGB' of a previous frame to determine whether the image signal RGB of the current frame is a still image signal. When the image signal RGB of the current frame is identical to the image signal RGB' of the previous frame during a predetermined time, the still image discriminator 540 may determine the image signal RGB of the current frame as a still image signal.

When it is determined that the image signal RGB of the current frame is the still image signal, the still image discriminator 540 may output an off-signal OFF of an active level. When the off-signal OFF has the active level, the compensator 510 and the hysteresis calculator 530 may stop the operation.

Figure 21A:
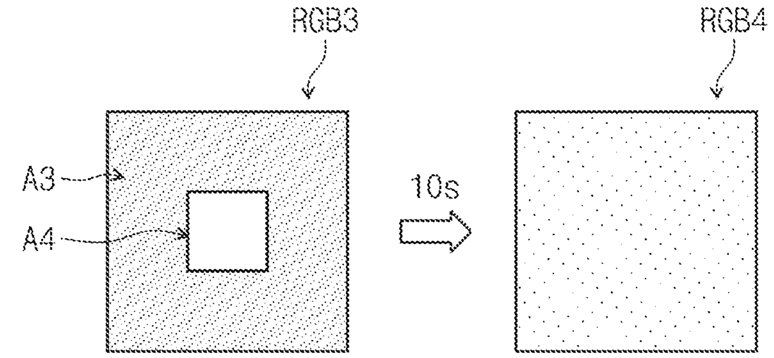
FIG. 21A illustrates a third image pattern and a fourth image pattern.

FIG. 21A illustrates a third image pattern RGB3 and a fourth image pattern RGB4.

Referring to FIG. 21A, a third image pattern RGB3 may be a pattern where pixels PX of a third area A3 of a display panel DP (refer to FIG. 1) display an image of gray scale level 0 and where pixels PX of a fourth area A4 display an image of gray scale level 128. A fourth image pattern RGB4 may be a pattern where all pixels PX of the display panel DP display an image of gray scale level 16. Driving controllers 100, 100-1, 100-2, 100-3, and 100-4 shown in FIGS. 6, 17, 18, 19, and 20 may receive an image signal RGB corresponding to the third image pattern RGB3 and may receive an image signal RGB corresponding to the fourth image pattern RGB4 after a predetermined time elapses (e.g., after 10 seconds).

Figure 21B:
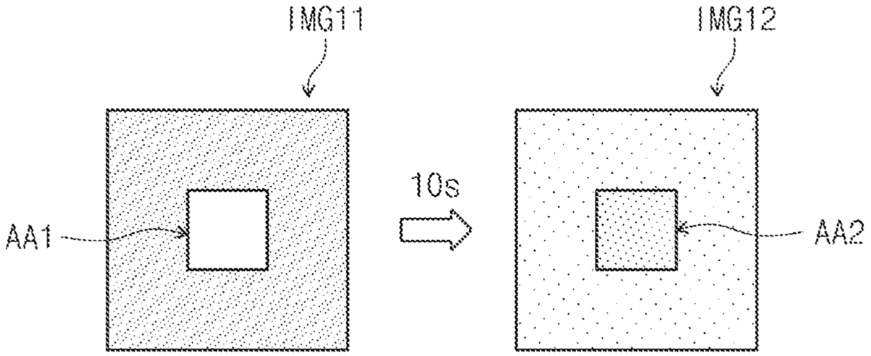
FIG. 21B illustrates images displayed on a display device when an image signal corresponding to a third image pattern and a fourth image pattern shown in FIG. 21A is received.

FIG. 21B illustrates images displayed on a display device when an image signal RGB corresponding to a third image pattern RGB3 and a fourth image pattern RGB4 shown in FIG. 21A is received.

Driving controllers 100, 100-1, 100-2, 100-3, and 100-4 shown in FIGS. 6, 17, 18, 19, and 20 may sequentially receive an image signal RGB corresponding to the third image pattern RGB3 and the fourth image pattern RGB4 and may output an image data signal DATA corresponding to the image signal RGB.

When the driving controllers 100, 100-1, 100-2, 100-3, and 100-4 do not perform a compensation operation, as shown in FIG. 21B, an image IMG 11 and an image IMG12 corresponding to the third image pattern RGB3 and the fourth image pattern RGB4 may be sequentially displayed on the display panel DP (refer to FIG. 1).

When the driving controllers 100, 100-1, 100-2, 100-3, and 100-4 do not perform a compensation operation, a portion AA1 of the image IMG11 may remain as an image sticking AA2 in the image IMG12 by a hysteresis characteristic of a first transistor T1 (refer to FIG. 2).

Figure 21C:
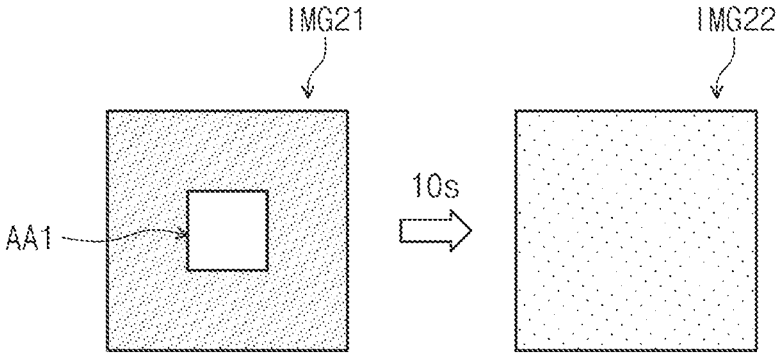
FIG. 21C illustrates images displayed on a display device when an image signal corresponding to a third image pattern and a fourth image pattern shown in FIG. 21A is received.

FIG. 21C illustrates images displayed on a display device when an image signal RGB corresponding to a third image pattern RGB3 and a fourth image pattern RGB4 shown in FIG. 21A is received.

Driving controllers 100, 100-1, 100-2, 100-3, and 100-4 shown in FIGS. 6, 17, 18, 19, and 20 may sequentially receive an image signal RGB corresponding to the third image pattern RGB3 and the fourth image pattern RGB4 and may output an image data signal DATA corresponding to the image signal RGB.

When the driving controllers 100, 100-1, 100-2, 100-3, and 100-4 perform a compensation operation, as shown in FIG. 21C, an image IMG 21 and an image IMG22 corresponding to the third image pattern RGB3 and the fourth image pattern RGB4 may be sequentially displayed on a display panel DP (refer to FIG. 1).

When the driving controllers 100, 100-1, 100-2, 100-3, and 100-4 perform a compensation operation, a hysteresis characteristic of a first transistor T1 (refer to FIG. 2) is compensated and a portion AA1 of the image IMG21 does not affect the image IMG22.

The display device having such a configuration may calculate a hysteresis characteristic change in pixel and may compensate for an image signal of a current frame based on a hysteresis characteristic of a previous frame to provide an image data signal to a display panel. Therefore, display quality may be improved.

While the invention has been described with reference to an embodiment thereof, it will be apparent to those of ordinary skill in the art that various changes and modifications may be made thereto without departing from the spirit and scope of the invention as set forth in the following claims. Thus, the technical scope of the invention is not limited to the contents described in the detailed description of the specification and shall be determined by the accompanying claims.

What is claimed is:

1. A display device, comprising:

a display panel including a pixel;

a driving controller which receives an image signal and outputs an image data signal in which the image signal is compensated, the driving controller including:

a memory which provides a previous hysteresis state value of a previous frame and receives a current hysteresis state value of a current frame;

a hysteresis calculator which calculates the current hysteresis state value of the current frame based on the image signal and the previous hysteresis state value of the previous frame from the memory, and stores the current hysteresis state value in the memory; and a compensator which calculates a compensation value based on the image signal and the previous hysteresis state value from the memory and compensates for the image signal depending on the compensation value to output the image data signal; and a data driving circuit which provides the pixel with a data signal corresponding to the image data signal, wherein the hysteresis calculator outputs a sum of multiplication of the image signal and a first weight and multiplication of the previous hysteresis state value and a second weight as the current hysteresis state value.

2. The display device of claim 1, wherein the hysteresis calculator includes a first lookup table, and wherein the hysteresis calculator outputs the current hysteresis state value corresponding to the image signal and the previous hysteresis state value with reference to the first lookup table.

3. The display device of claim 1, wherein the compensator includes a second lookup table, and wherein the hysteresis calculator obtains the compensation value corresponding to the image signal and the previous hysteresis state value with reference to the second lookup table and compensates for the image signal depending on the compensation value to output the image data signal.

4. The display device of claim 1, wherein the pixel includes first to third color pixels, and wherein the current hysteresis state value includes first to third state values respectively corresponding to the first to third color pixels.

5. The display device of claim 1, wherein the hysteresis calculator divides the display panel into a plurality of blocks, calculates a representative value corresponding to each of the plurality of blocks in the image signal, and calculates the current hysteresis state value corresponding to each of the plurality of blocks based on the representative value corresponding to each of the plurality of blocks and the previous hysteresis state value corresponding to each of the plurality of blocks.

6. The display device of claim 1, wherein the hysteresis calculator includes:

a calculator which calculates a state value based on the image signal and the previous hysteresis state value of the previous frame, the previous hysteresis state value being stored in the memory; and a dithering unit which dithers the state value using a plurality of dither patterns and outputs the current hysteresis state value corresponding to a result of dithering the state value.

7. The display device of claim 1, wherein the hysteresis calculator calculates the current hysteresis state value based on the image signal and the previous hysteresis state value every predetermined time and stores the current hysteresis state value in the memory.

8. The display device of claim 7, wherein the compensator includes a difference value calculator which calculates a difference value between the image signal and the previous hysteresis state value and outputs an update signal at an active level when the difference value is greater than a reference value, and wherein the hysteresis calculator calculates the current hysteresis state value based on the image signal and the previous hysteresis state value, when the update signal is at the active level.

9. The display device of claim 8, wherein the hysteresis calculator includes a counter which is synchronized with the update signal to operate, and wherein the hysteresis calculator calculates the current hysteresis state value of the current frame based on the image signal, the previous hysteresis state value, and a count value of the counter.

10. The display device of claim 1, further comprising:

a still image discriminator which compares an image signal of the current frame with an image signal of the previous frame to determine whether the image signal of the current frame is a still image signal.

11. The display device of claim 10, wherein the hysteresis calculator and the compensator do not operate, when the image signal of the current frame is the still image signal.

12. A display device, comprising:

a display panel including a pixel;

a driving controller which receives an image signal and outputs an image data signal in which the image signal is compensated; and a data driving circuit which provides the pixel with a data signal corresponding to the image data signal, the driving controller including:

a memory which provides a previous hysteresis state value of a previous frame and receives a current hysteresis state value of a current frame;

a multiplexer which outputs any one of the image signal and the image data signal as an output signal;

a hysteresis calculator which calculates the current hysteresis state value of the current frame based on the output signal from the multiplexer and the previous hysteresis state value of the previous frame, form the memory, and stores the current hysteresis state value in the memory; and a compensator which calculates a compensation value based on the image signal and the previous hysteresis state value from the memory and compensates for the image signal depending on the compensation value to output the image data signal, wherein the hysteresis calculator outputs a sum of multiplication of the output signal from the multiplexer and a first weight and multiplication of the previous hysteresis state value and a second weight as the current hysteresis state value.

13. The display device of claim 12, wherein the hysteresis calculator includes a first lookup table, and wherein the hysteresis calculator outputs the current hysteresis state value corresponding to the output signal from the multiplexer and the previous hysteresis state value with reference to the first lookup table.

14. The display device of claim 12, wherein the compensator includes a second lookup table, and wherein the hysteresis calculator obtains the compensation value corresponding to the output signal from the multiplexer and the previous hysteresis state value with reference to the second lookup table and compensates for the image signal depending on the compensation value to output the image data signal.

15. The display device of claim 12, wherein the hysteresis calculator divides the display panel into a plurality of blocks, calculates a representative value corresponding to each of the plurality of blocks in the output signal from the multiplexer, and calculates the current hysteresis state value corresponding to each of the plurality of blocks based on the representative value corresponding to each of the plurality of blocks and the previous hysteresis state value corresponding to each of the plurality of blocks.

16. The display device of claim 12, wherein the hysteresis calculator includes:

a calculator which calculates a state value based on the output signal from the multiplexer and the previous hysteresis state value of the previous frame, the previous hysteresis state value being stored in the memory; and a dithering unit which dithers the state value using a plurality of dither patterns and outputs the current hysteresis state value corresponding to a result of dithering the state value.

17. The display device of claim 12, wherein the hysteresis calculator calculates the current hysteresis state value based on the image signal and the previous hysteresis state value every predetermined time and stores the current hysteresis state value in the memory.

18. The display device of claim 17, wherein the compensator includes a difference value calculator which calculates a difference value between the image signal and the previous hysteresis state value and outputs an update signal at an active level when the difference value is greater than a reference value, and wherein the hysteresis calculator calculates the current hysteresis state value based on the output signal from the multiplexer and the previous hysteresis state value, when the update signal is at the active level.

* * * * *